United States Patent [19]

Rupp

[11] Patent Number: 5,727,173
[45] Date of Patent: Mar. 10, 1998

[54] TOGGLE BUS CIRCUIT

[75] Inventor: Charlé R. Rupp, Bolton, Mass.

[73] Assignee: National Semiconductor Corporation, Santa Clara, Calif.

[21] Appl. No.: 567,172

[22] Filed: Dec. 5, 1995

[51] Int. Cl.$^6$ .................................................. G06F 13/00
[52] U.S. Cl. .................................... 395/311; 395/312
[58] Field of Search ............................ 395/311, 312; 370/360

[56] References Cited

U.S. PATENT DOCUMENTS

| | | | |
|---|---|---|---|
| 4,044,333 | 8/1977 | Auspurg et al. | 395/311 |
| 4,472,712 | 9/1984 | Ault et al. | 340/825.5 |
| 4,811,210 | 3/1989 | McAullay | 395/312 |
| 4,882,683 | 11/1989 | Rupp et al. | 364/521 |
| 4,958,303 | 9/1990 | Assarpour et al. | 364/521 |
| 5,202,593 | 4/1993 | Huang et al. | 307/475 |
| 5,218,240 | 6/1993 | Camarota et al. | 307/443 |
| 5,313,590 | 5/1994 | Taylor | 395/311 |
| 5,392,406 | 2/1995 | Petersen et al. | 395/311 |
| 5,604,735 | 2/1997 | Levinson et al. | 370/360 |

OTHER PUBLICATIONS

Kai Hwang and Faye A. Briggs, "Computer Architecture and Parallel Processing," McGraw Hill, 1984, pp. 325–392.
Howard Jay Siegel and William Tsun-yuk Hsu (Ed. Veljko M. Milutinovic), "Computer Architecture: Concepts and Systems," North–Holland, 1988.

Primary Examiner—Ayaz R. Sheikh
Attorney, Agent, or Firm—Limbach & Limbach L.L.P.

[57] ABSTRACT

A bus transceiver system transfers data among a plurality (N) of system components. The system includes N toggle bus transceiver circuits ($TBT_i$, for i=0 through N−1), each of which corresponds to a respective one of the system components. Each toggle bus transceiver circuit has bi-directional driver circuitry which has M first terminals ($D_{i,j}$, for j=0 through M−1). Each of the M first terminals are coupled to a respective bit of the system component to which that toggle bus transceiver circuit corresponds. Each toggle bus tranceiver circuit further has M second terminals ($P_{i,j}$). Driver switch circuitry of each toggle bus transceiver circuit selectively connects each of the M first terminals to at least one of said M second terminals. In a first mode, the driver circuitry drives in a first direction and in a second mode, the driver circuitry drives in a second direction. Repeater of each toggle bus transceiver circuit has M third terminals ($Q_{i,j}$) and M latch circuits ($L_{i,j}$). Repeater switch circuitry selectively connects each of the M third terminals to at least one of the latch circuits. In the first mode, each latch circuit latches a data signal provided at the third terminal to which the latch circuit is connected, and in the second mode, the latch circuit provides a data signal latched by the latch circuit to the third terminal to which said latch circuit is connected. A permuted interconnect network couples the second terminals of the toggle bus transceiver circuit bi-directional driver circuitry to the third terminals of the toggle bus transceiver circuit repeater circuitry for permuted signal transfer therebetween.

12 Claims, 26 Drawing Sheets fig.5

*fig.7*

| | | | | | | |
|---|---|---|---|---|---|---|
| ID | D—□—Y | Identity Element<br>Y = D | HA | [HA box] | | Half adder circuit<br>Y0 = A ^ B<br>Y1 = A&B |
| INV | D—[1]▷—Y | Inverter Element<br>Y = D' | FA1 | C—[FA]—Y0<br>B<br>A—Y1 | | Full adder circuit<br>Y0 = A ^ B ^ C<br>Y1 = A&B ^ C&(A ^ B) |
| BUFZ | E<br>D—[1▽]—Y | TriState(TM) Driver<br>Y = (E) ? D : Z | | | | |
| AN2 | A—[&]—Y<br>B | Two input AND<br>Y = A & B | CG | C—[CG]—Y<br>B<br>A | | Carry Generate circuit<br>Y = A&B ^ C&(A ^ B) |
| OR2 | A—[+]—Y<br>B | Two Input OR<br>Y = A \| B | | | | |
| XO2 | A—[^]—Y<br>B | Two Input XOR<br>Y = A ^ B | AKN | C<br>D0—▷◯—Y<br>D1 | | Aker's Node<br>Y = C ? D1 : D0 |
| | | | MUX21 | C<br>D0—[2:1]—Y<br>D1 | | Two Input Multiplexer<br>Y = C ? D1 : D0 |
| | 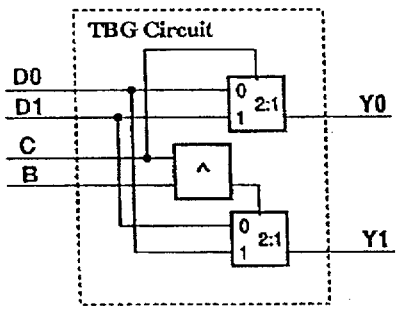TBG Circuit | | TBG | B<br>C<br>D0—[X]—Y0<br>D1—Y1 | | Toggle Bus Exchange Gate<br>Y0 = (C) ? D1 : D0<br>Y1 = (C ^ B) ? D0 : D1 |
| | | | LD1 | C<br>D—[LD1]—Q | | Transparent Latch<br>Q = (C) ? D : Q |

*fig.18*    TBX Circuit Partitioning Property Decision Graph Illustration fig.24
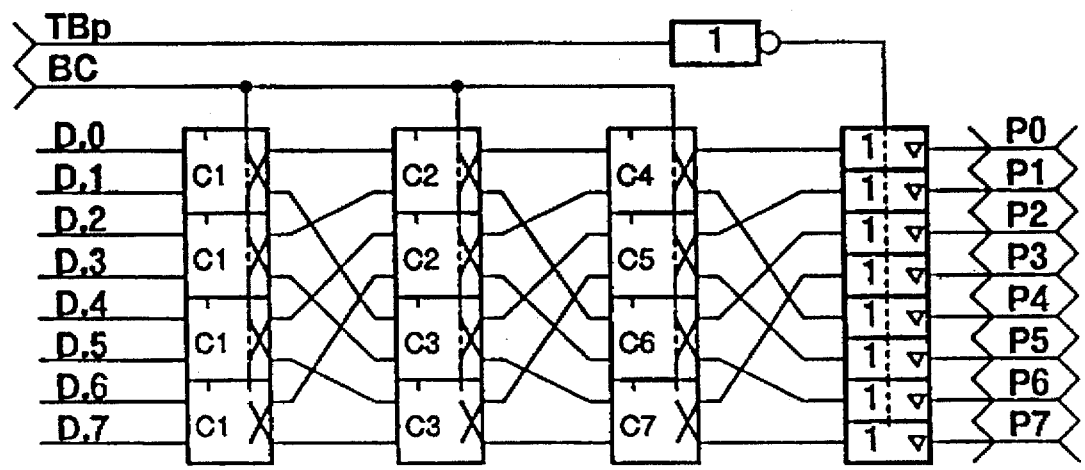
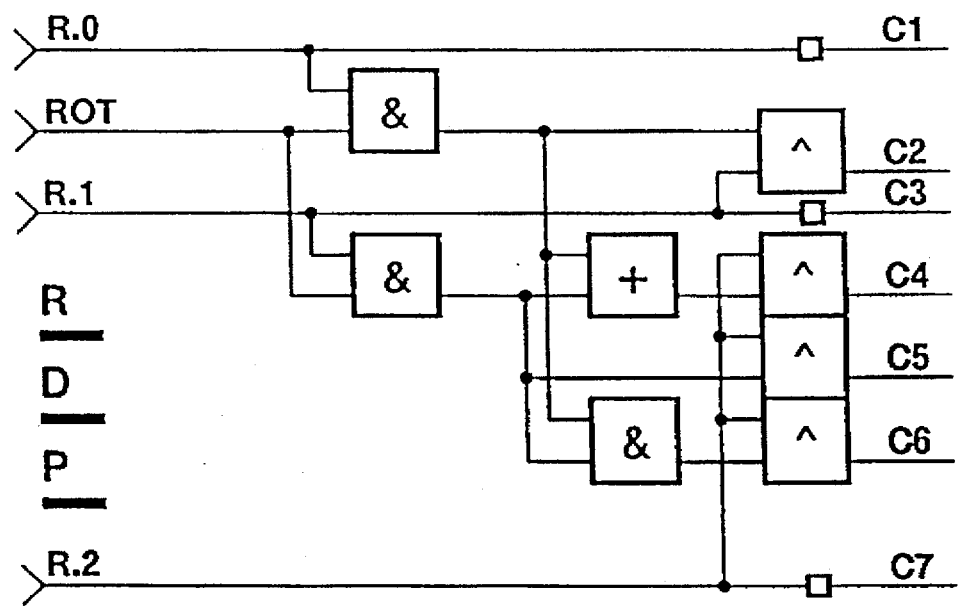

fig.34
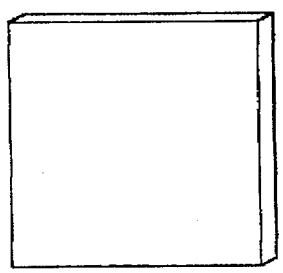
SM0 Block
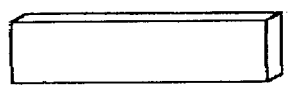
AM420
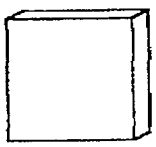
AM330
AM240
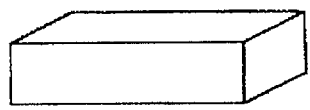
SM2 Block
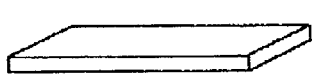
AM402
AM312
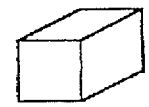
AM222
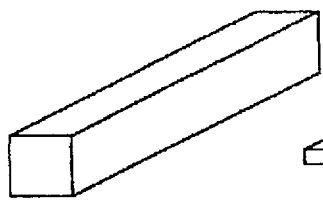
SM4 Block
AM202
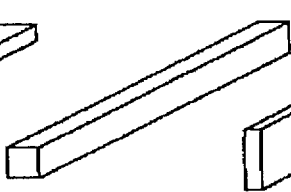
AM112
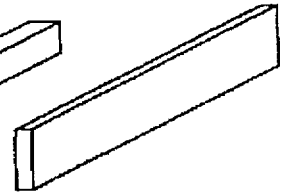
AM022

TOGGLE BUS CIRCUIT

FIELD OF THE INVENTION

The present invention relates to bus transceiver systems and, more particularly, to a bus transceiver system whose bandwidth increases as the number of components connected to the system increases.

BACKGROUND OF THE INVENTION

A well-known bus system interface consists of M Tristate® data lines which form a "component word". An enable control signal allows a particular addressed component to drive the data lines. Otherwise, if the component is not addressed, it presents a high impedance to the data lines. As such, a multiplicity "N" of system components may be connected to the same bus lines, and one enabled component may be the source of data to all of the other components. This simple bus structure has been universally adopted as the basis of for system level interconnect.

However, there are at least two fundamental weaknesses of the standard bus interface. First, the data bandwidth (e.g., measured by the number of bits of data transferred per unit of time) of this standard bus interface is constant (e.g., "M" bits per transaction) and, significantly, does not take advantage of the increased number of connections available when more components are added to the system. In addition, as additional components are added to the system, capacitance is added to the wiring network which degrades bus performance.

SUMMARY OF THE INVENTION

The present invention is a novel interconnect bus system that provides increased transfer performance, particularly in systems whose data transfers can be derived from data broadcast, reflection and rotation operations. The system architecture extends the standard tristate bus architecture and can be implemented either by embedding novel transceiver circuits into a new system component design or by adding repeater components to an existing system design.

The performance increase possible is proportional to the number of transceiver circuits employed. The system generally operates in two phases, where data is transferred over the same interconnect wiring, in both directions, on alternate phases.

The cost of the interface can be reduced by time multiplexing the data path and control circuits. In addition, dissimilar components can be integrated together for use together in a complex system. Linear scaleable systems can be developed which provides customers with a range of cost performance using the same components.

BRIEF DESCRIPTION OF THE DRAWING

FIGS. 5 and 6 illustrate the permuted interconnect network for an 8 by 8 Type A or Type B system.

FIG. 7 illustrates basic gate symbols used in the remaining figures.

FIGS. 23 and 24 show a toggle bus driver (TBD), with rotation and broadcast control, for M=4 and M=8, respectively.

FIG. 34 shows allowed addressing modes for the FIG. 31 system for the case of four DGEN components.

DETAILED DESCRIPTION OF THE INVENTION

Basically, Applicant's invention is directed to a bus system in which the signal bandwidth per data transaction on the bus is proportionally increased relative to the number of components connected to the bus system. Specifically, each of N components are attached to the bus system via a separate "node", and M·N bits can be transferred over the bus per cycle, where M≧N. Each component retains standard bus capabilities. If some components do not require increased bandwidth, these components may be connected to the bus via a single toggle bus interconnection node.

In accordance with the invention, at least four different types of basic structures may be implemented. In addition, many variations may be achieved based on these four basic types.

Figure 1:
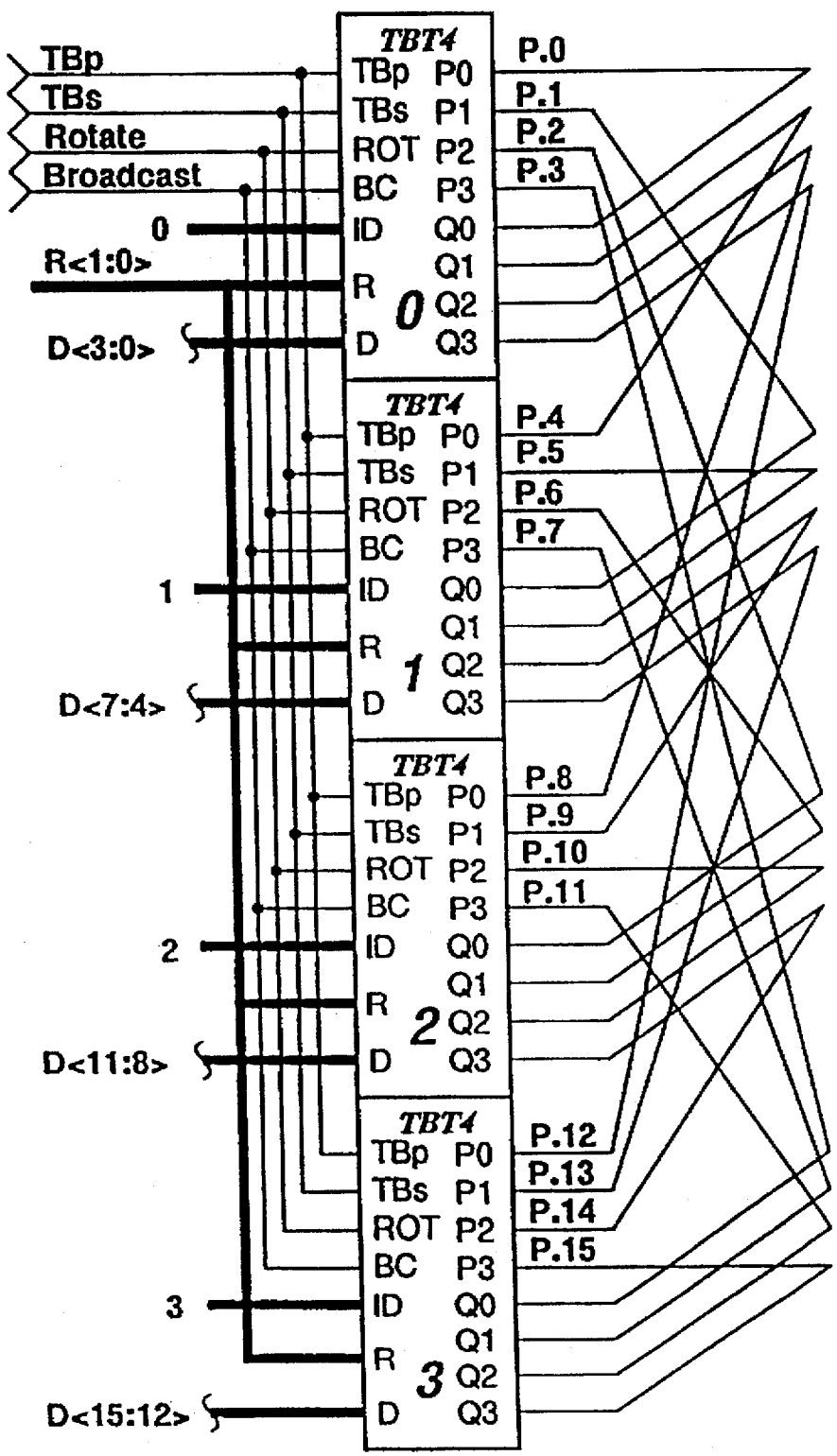
FIG. 1 illustrates a type A system having four bits per word and four components (referred to as a 4 by 4 system) in which a Toggle Bus Transceiver (TBT) is embedded into each system component.

FIG. 1 is a block diagram which illustrates a type A" system. The particular embodiment shown has four bits per word and four "TBT" components, TBT4(0) through TBT4(3). Thus, the FIG. 1 embodiment is referred to as a 4 by 4 system. The TBT components are connected to each other via a permutation network, P.0 through P.15. The toggle bus transceiver is embedded into each TBT component. When all of the TBT components have the same configuration, the system is referred to as a homogeneous network. By contrast, when dissimilar components having TBT circuits are connected the system is referred to as a heterogeneous network. Heterogeneous networks use a subset of toggle bus capabilities to improve system performance by allowing more than one word to be transferred in one cycle. Homogeneous networks allow increased system performance by replicating the same circuit so that more bits/words are processed per unit time. For homogeneous networks both bit level and word level data permutations may be combined so that the system may be viewed as operating on a M·N bit word on each clock cycle. For example, the whole Toggle Bus Word (TBW) may be rotated an arbitrary amount in one clock cycle. The type A" system gains the improved performance at the expense of having 2·M bus connection pins in contrast to M pins for a standard bus.

Each TBT has an M-bit P" bus which may be used as a standard bus interface and an M-bit Q" bus which is dedicated for toggle bus operations. To control the more complex data transactions of a toggle bus system, several control signals are used as illustrated in the figure. The TBp" signal is the toggle bus phase. Each data transaction requires two phases: during φ0 (TBp signal set to 0" logical value) components drive source data from the P" bus lines to the Q" bus lines and during φ1 (TBp signal set to 1" logical value) the permuted data is returned from the transceivers from the Q" bus lines back to the P" bus lines. This back and forth action is the basis for the name Toggle Bus". Data permutations during the φ0 phase are called bit permutations whereas the data permutations during the φ1 phase are called word permutations. The combination of bit and word permutation is called the system permutation. The TBs" signal is the toggle bus strobe. Source data from the P" bus lines must be stored in the Toggle Bus Register (TBR) in the transceiver during φ0. The rotate (ROT) and broadcast (BC) signals control the data transfer mode of the data transaction according to the following table:

TABLE 1

Toggle Bus Transaction Modes

| ROT | BC | Function |
|---|---|---|
| 0 | 0 | Reflection |
| 0 | 1 | Broadcast |
| 1 | 0 | Rotation |
| 1 | 1 | (Reserved) |

The R" vector of Lg(M)/2 bits[1] is an index value having different meanings depending on the mode and the phase. For example, R is the index of the source component for broadcast operations during the word phase whereas R represents the shift amount during rotation operations. The toggle bus mode may change from one phase to the next. For example, the system may be set to rotate a value during φ0 and then broadcast the rotated value during φ1. The basic toggle bus data transactions are defined in the next section. Finally, each component has a Lg(N) bit identifier constant (shown as the ID input in the figure) which uniquely identifies the position of the component in the array. In typical applications, the ID values are defined by pin-programming or during the power up sequence.

[1] Throughout this disclosure, including in the claims, the notation Lg(.) means logarithm base 2.

The capabilities of a toggle bus system result from the unique TBT circuitry and the peculiar interconnection of the P and Q bus lines. Although seemingly irregular, there is a very simple rule that defines the wiring structure:

Label each component 0, 1, . . . N−1 (the identifier value"). Label each bit of the P" bus for component i in the sequence 0, 1, . . . , M−1 and similarly label each Q" bus bit 0, 1, . . . , M−1 where bit number 0" represents the least significant bit of the words. Then the j-th bit of the P bus on the i-th component is connected to ((j div N)·(M div N)+i)-th bit of the Q bus on the (j mod N)-th component.

This connection rule is mathematically referred to in the literature as a perfect shuffle". For systems in which M≡N the rule simplifies to Pi,j is connected to Qj,i". (Throughout this disclosure, including in the claims, the notation "K mod N" means the remainder of K divided by N. "K div N" means the integer quotient of K divided by N.)

Figure 2:
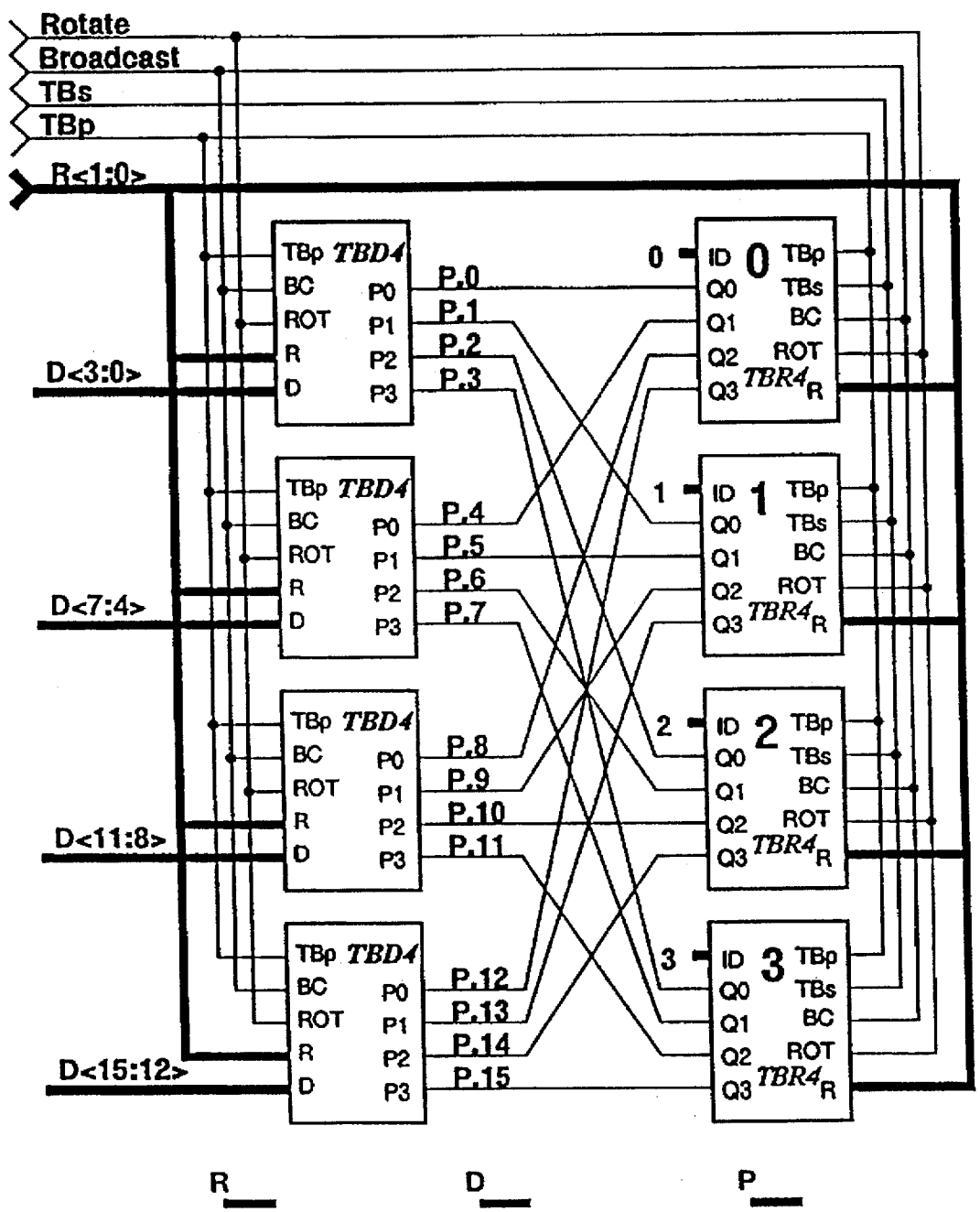
FIG. 2 illustrates a Type B structure for a 4-bit per component, 4 component system in which the Toggle Bus Repeater (TBR) circuit is implemented in an external component.

For applications where the increased number of pins of the full transceiver cannot be tolerated (e.g., due to cost), the transceiver may be split into two circuits. One circuit is called the Toggle Bus Driver (TBD) and the other circuit is called the Toggle Bus Repeater (TBR). The TBD may be embedded into the component and requires only M data lines (same as for a standard bus interface). The TBR circuit is implemented externally to the component. This is the Type "B" structure as illustrated in FIG. 2 for a b 4-bit per component, four component system (referred to as a "4 by 4" system).

Significantly, a type "B" system allows for minimizing the cost when only one component is to be used in a system. In this case, the bit level operations of the TBD are still available, but no TBs clock action is required. The TBp signal is set to constant "0", and the component interacts with the rest of the system as a standard bus component. When several components are to be used together, full toggle bus capability is available.

Figure 3:
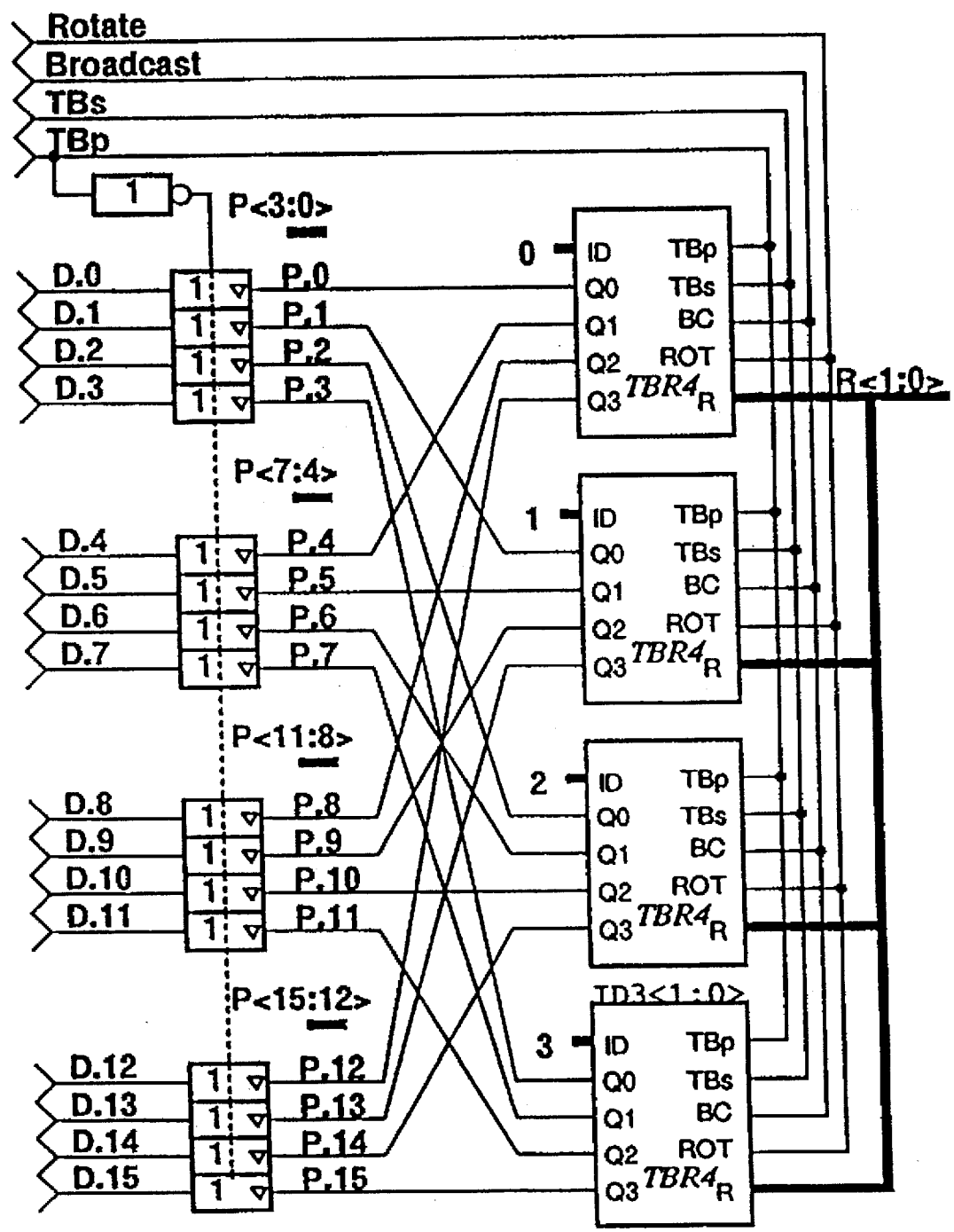
FIG. 3 illustrates a Type C system which uses only TBR components.

When a component does not need bit level operations, or to incorporate components which have only a standard bus interface, a toggle bus system may still be developed by using only the Toggle Bus Repeater (TBR) components. This is the type "C" system as illustrated in FIG. 3 for a 4 by 4 system. One possible use the type "C" structure is for a multiple dimension access memory in image and signal processing applications, where the components having a standard bus interface are M-bit wide static or dynamic memory components.

Figure 4:
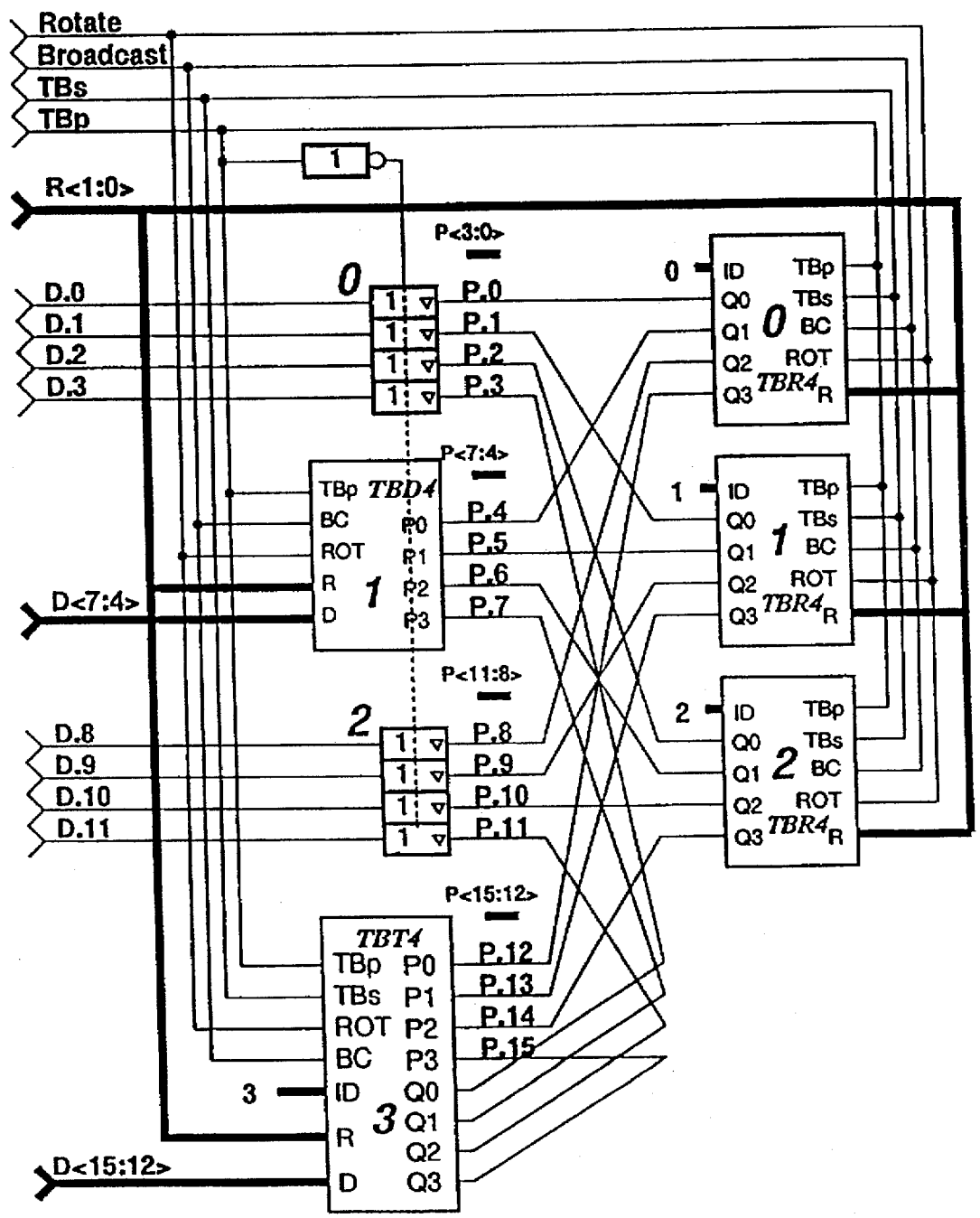
FIG. 4 illustrates a Type D, hybrid, system which uses the components of the Type A, Type B and Type C systems of FIGS. 1, 2 and 3, respectively.

For general use of the toggle bus architecture, components of the previous three types may be combined into one ("hybrid") system called the type "D" system as illustrated in FIG. 4. A type "D" system is illustrated in FIG. 4. The type "D" system integrates many types of components while still maintaining full word level capabilities for all components and bit level capabilities for those components which have TBT or TBD circuits. This system structure is particularly useful for highly integrated circuit boards having dissimilar components. One such system is a highly integrated "multi-IO" module for a personal computer in which the toggle bus components include standard bus memories, a PCI bus transceiver, a sound processor, and a graphics controller.

Figure 5:
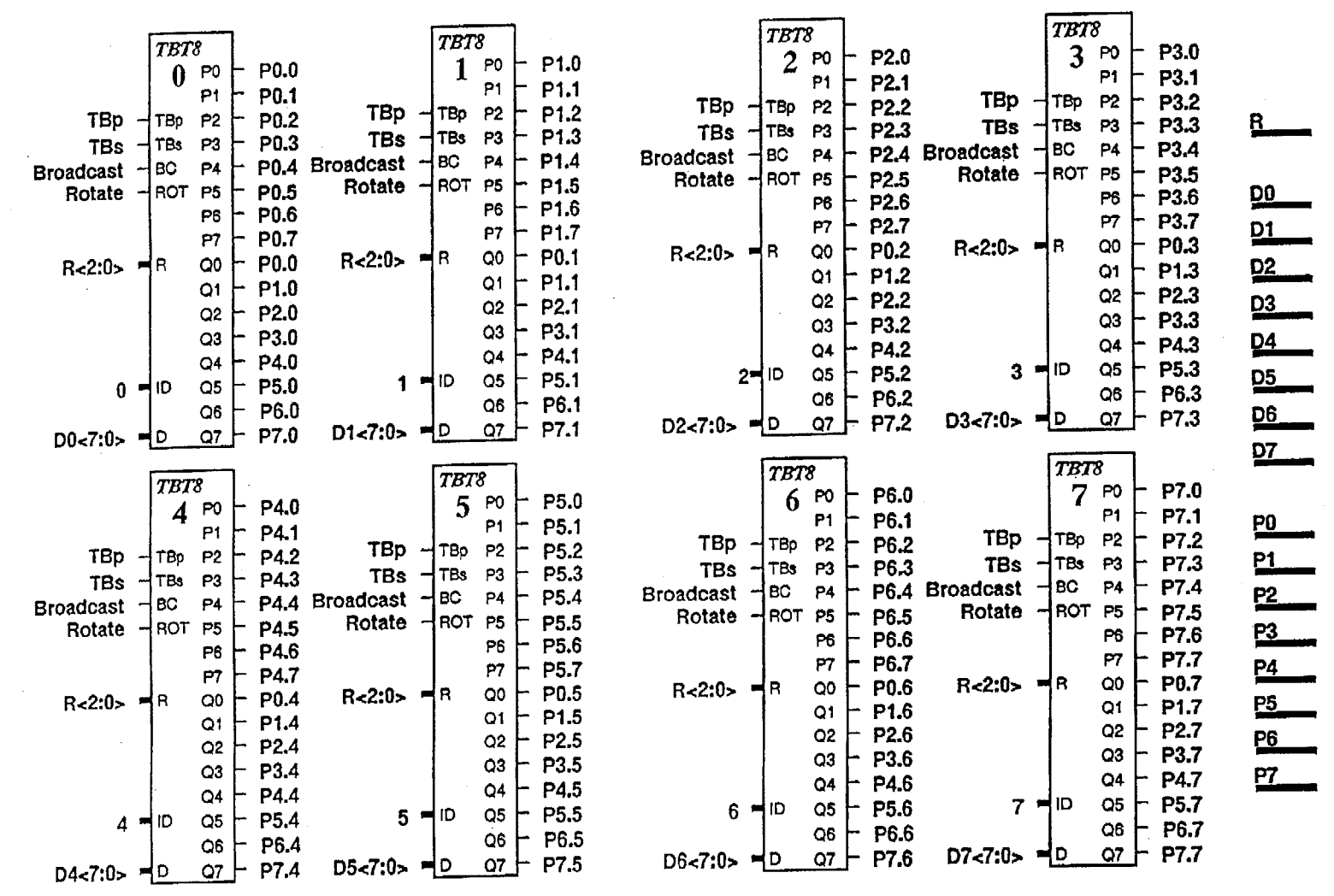
Figure 6:
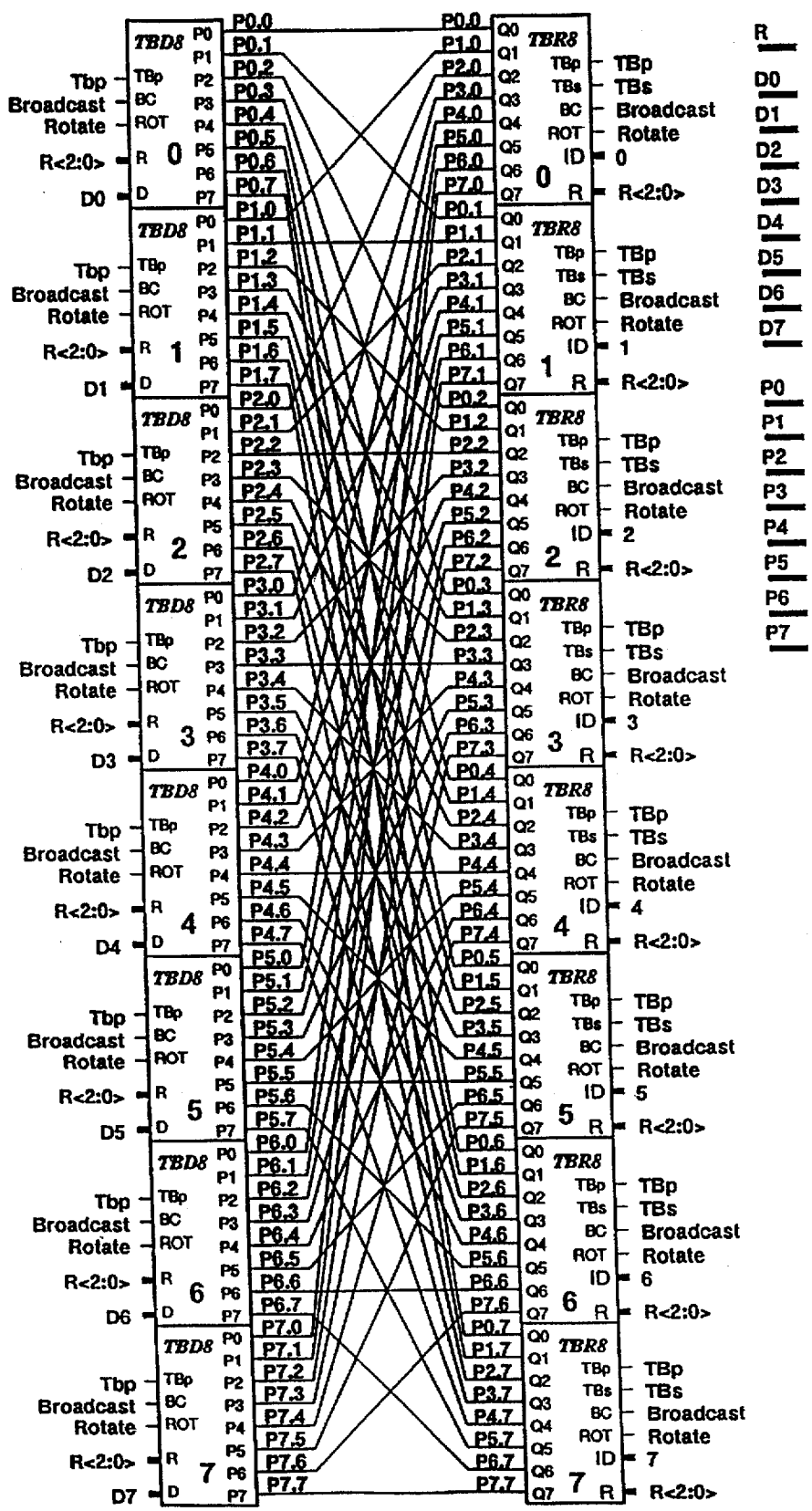

Typical components with a toggle bus interface use 8, 16, 32 or more bits per word. For completeness of disclosure, the interconnect for 8 by 8 systems of type "A" and "B" is illustrated in FIGS. 5 and 6.

Toggle Bus Sequences and Operations

In one use of the toggle bus system, a toggle bus transaction consists of a bit-level phase φ0 followed by a word-level phase φ1. A toggle bus transaction sequence may also consist of only bit-level phases (local operations only) and multiple word-phases (for example, differing rotation values for the same toggle bus register value). The detailed operations of each phase are described below. It is significant to note that there is no restriction on the combination of operations possible so long as the integrity of the tristate lines is maintained. That is, no two devices may drive the same line with different values.

Broadcast is the simplest operation on a toggle bus. During the broadcast operation, data is transferred from one of the components (the source) to all of the other components, without bit level modification. In this case, the R value is the identifier number of the source component. In this special case, the toggle bus strobe is held at the active level. This leaves the latches of the toggle bus register in a transparent mode, and data thus flows through these transparent latches with combinational delay only. To summarize, the control signal settings for this operation are as shown in Table 2:

TABLE 2

Simple Broadcast Controls

| φ | R | TBp | TBs | ROT | BC |
|---|---|---|---|---|---|
| 1 | Source ID | 1 | 0 | 0 | 1 |

In the broadcast mode, the system acts like a standard bus in that data is transferred from one component to one or more other components without the need for an intermediate clock cycle.

To execute a full bit level rotation of the M·N bit system word requires a full toggle bus cycle. In the general case, the rotation index has Lg(N)+Lg(M) bits, where the upper Lg(N) bits of the rotation index designates the word level rotation and lower Lg(M) bits designates the bit level rotation. For this example, these two values will be referred to as the $R_{hi}$ and $R_{lo}$ fields. The full rotation sequence is then as shown in Table 3:

TABLE 3

Full Rotation sequence

| φ | R | TBp | TBs | ROT | BC |
|---|---|---|---|---|---|
| 0 | $R_{lo}$ | 0 | 0 | 1 | 0 |
| 0 | $R_{lo}$ | 0 | 1 | 1 | 0 |
| 1 | $R_{hi}$ | 1 | 1 | 1 | 0 |

A typical application of the full rotation sequence is for the BitBlt operation in computer graphics, which requires moving large amounts of data from one location in memory to another with bit-level shifting. For many other applications, only word level rotation is needed. For these other applications, the R value would be set to 0 for the bit phase of the clock cycle, and data would be loaded into the toggle bus register without bit permutation. Once the toggle bus register is loaded, the R index may be changed in the word phase of the clock cycle so that data is distributed to all of the components without additional toggle bus clock cycles.

The third type of data manipulation operation is the "reflection" operation. This is a less familiar data permutation which may often be substituted for rotations. The reflection operation is typically the least expensive way (in terms of clock cycles required) to implement multiple dimension memory access for imaging and digital signal processing applications (for example, various forms of the Fast Fourier Transform algorithm). Mathematically, the reflection permutation is defined as an operation in finite fields with simple implementation using the exclusive-OR operator. That is, if R is the reflection index and k and j are the index of the source and destination components of the data, then the destination index j for source data k is given simply by the bitwise exclusive-OR of R and k. Symbolically:

j=R^k

Table 4 illustrates the reflection operation for an eight element array. Each entry in Table 4 represents the destination component for different R values, given the source component in the left column.

TABLE 4

Reflection Operation Table for 3 bits

| k\R | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 3 | 2 | 5 | 4 | 7 | 6 |
| 2 | 2 | 3 | 0 | 1 | 6 | 7 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 5 | 4 | 7 | 6 | 1 | 0 | 3 | 2 |
| 6 | 6 | 7 | 4 | 5 | 2 | 3 | 0 | 1 |
| 7 | 7 | 6 | 5 | 4 | 3 | 2 | 1 | 0 |

An interesting reflection operation results when the reflection index (R) is all ones: this results in the total reversal of the data and is useful for both bit level and word level algorithms. The reflection operation which results when R=1 allows components which neighbor each other to exchange data. All reflections are required in order to implement multiple dimension access memory systems.

As discussed above, the operating mode of the toggle bus system does not have to be the same for the two phases of a toggle bus transaction. For example, for many algorithms in image processing and computer graphics, a reflection in the bit phase may be combined with a rotation in the word phase.

Theory of Operation

Figure 8:
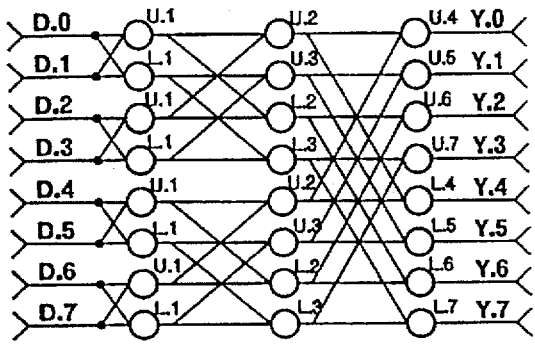
FIG. 8 illustrates control circuitry (a Toggle Bus Exchange, or TBX, circuit) which is a network of Lg(M) columns of M switches per column (nominally 2 to 1 multiplexers) for implementing broadcast and rotation capabilities.

The theory of operation of the toggle bus architecture is derived from the partitioning property of a full reflection switching network. The broadcast and rotation capabilities are provided with the addition of control circuitry. Basically, the control circuitry includes a network of Lg(M) columns, with M switches per column (nominally 2 to 1 multiplexers). Such a network is illustrated in FIG. 8, using the basic gate symbols of FIG. 7 as building blocks. The FIG. 8 circuit is for eight bit words. Each circle represents a basic switch. When the control signal for a switch is logic "0", the switch output is the same as the horizontal line data input. When a switch control signal is "1", the switch output has the same value as the angle line signal input value.

Figure 9:
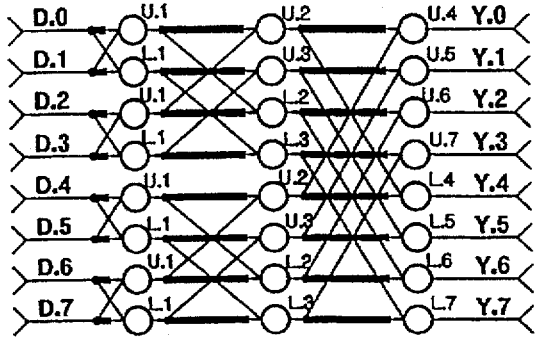
FIG. 9 illustrates how the FIG. 8 TBX achieves an identity permutation.

With the angled line connections in the Toggle Bus Exchange (TBX) circuit, specific settings of the switch control signals allows each output to be connected to any of the inputs. These connections may be understood by considering the Hamming distance between an output line j and an input line k. The Hamming distance between these two points is given by the bitwise exclusive-OR of j and k. For example, the Hamming distance between input line 3 and output line 3 is 0. For line input 3 to be connected to output line 3, the connection path must realize Hamming distance 0. This is achieved when the switch controls in the path between input line 3 and output line 3 are all 0. When all the switches in the network are provided with a switch control signal having value 0, all input lines are connected to the same output line. This is called the Identity permutation and allows the output of the network to be the same as the input. The data paths for the Identity permutation are shown in FIG. 9.

To accomplish an arbitrary reflection permutation, each column implements an orthogonal distance which is a power of two. The first column implements Hamming distance 2 or 0, the second column implements distance 4 or 0 and so forth. In general, the angle line input for the switch in row j of column i is connected to the output of the switch on row j^$2^i$ in column (i–1). By setting all of the controls in column i to bit i of index R, the columns taken collectively form a linear basis to realize any Hamming distance R.

Figure 10:
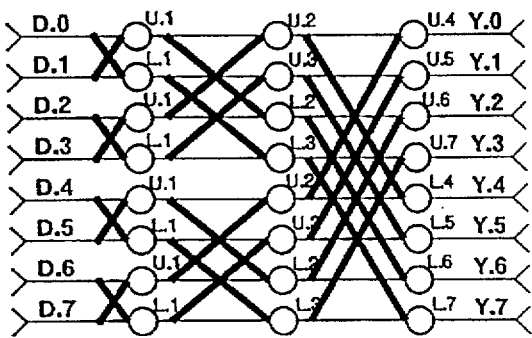
FIG. 10 illustrates how the FIG. 8 TBX achieves a reflection permutation.

For example, FIG. 10 illustrates how a full bit reversal permutation is implemented by setting the control signals for all of the switches to have logical control value "1". As a result, all outputs then have Hamming distance 7 from the associated input.

Due to the "buddy" property of the network, there is a basic restriction on the switch control signals. To ensure that no data is lost, each switch on row j of column i must have the same value as the buddy switch at row j^$2^i$ of the same column. Thus, there are in reality only M·Lg(M)/2 independent switch controls possible for an M bit TBX circuit. For the purposes of the discussion that follows, the switch with the smaller line number in a buddy pair is called the "upper" switch and the buddy switch is called the lower switch. If the control signal provided to an upper switch has a different value from the control signal provided to its buddy switch, then one input is lost while the other input is duplicated to the output of both switches.

Figure 11:
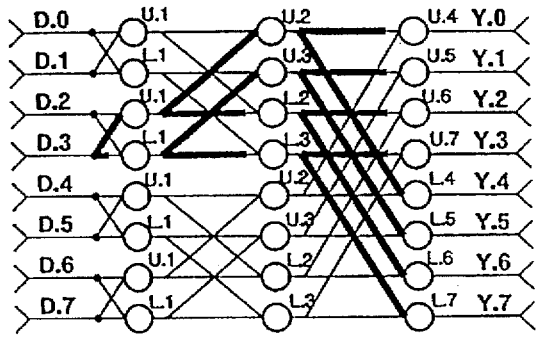
FIG. 11 illustrates how the FIG. 8 TBX achieves a broadcast connection.
Figure 13:
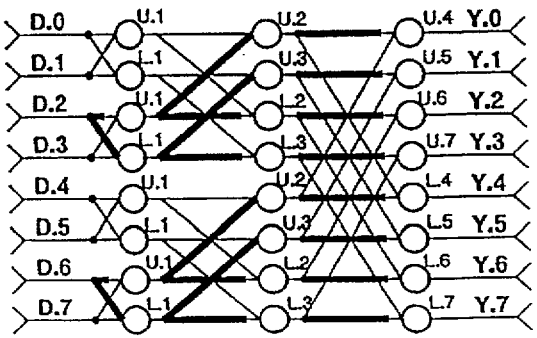
FIG. 13 illustrates how the FIG. 8 TBX achieves a multiple broadcast permutation.

The broadcast data pattern is created by purposely violating the just-discussed permutation restriction. To broadcast the bit at line input k, the control values for the upper switches are set for a reflection permutation k. This creates a path from input line k to output line 0. The control values for the lower buddy switches are then set to have a value which is opposite the value of the upper switches. As a result, all outputs have a path to the same input. This is illustrated in FIG. 11 for the case of broadcasting line 3 to all outputs. For advanced applications, more than one input may be a broadcast source to a subset of the outputs by maintaining the buddy rule for some selected columns. For example, FIG. 13 shows how line 2 is broadcast to output lines 0,1,2 and 3 while line 6 is broadcast to output lines 4,5,6 and 7.

The rotation permutations require the most complex controls in a TBX circuit. The mathematical requirement for a rotation permutation is that, for a rotation value of R, each output line j must have integer distance (not Hamming distance) of (k+R) mod M from the k-th input line. The distance 2 column (the left column in the example figures) still has only one control value since all even rotations require a distance change of 0 in the first column and all odd rotations require a distance change of 1 in the first column.

Figure 12:
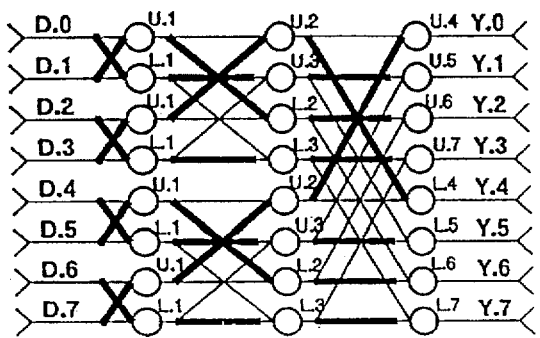
FIG. 12 illustrates how the FIG. 8 TBX achieves a rotation permutation.

FIG. 12 illustrates the switch control values required for a rotation by 1 in the eight bit TBX circuit. The switch settings for a given rotation index R depends on the line number and the column. To understand the rotation control setting algorithm, it is helpful to understand that each upper switch in a pair in column j has the ability to change the data distance by 0 or $+2^j$; each lower switch has the ability to change the integer distance by 0 or $-2^j$. In addition, the buddy pair restriction must be satisfied. In the FIG. 12 example, line 7 must map to line 0 in the rotation by 1. This is achieved by setting the switches to integer distance –1 in the first column, –2 in the second column and –4 in the third column, which is arithmetically equivalent to adding 1 to 7 mod 8.

To implement any arbitrary rotation in an M bit TBX circuit, M–1 independent controls signals are required. This is achieved by having one independent control in the distance 2 column, 2 independent controls in the distance 4 column, 4 independent controls in the distance 8 column, and so forth.

Mathematically, the Hamming distance (which defines the control settings) to rotate input line k to output line (k+R) mod M are:

$$D = k \char`\^ ((k+R) \bmod M)$$

The logic equations for the controls in each path are determined by expanding the addition (k+R) mod M using the Boolean equations for an adder circuit. Given two L-bit binary numbers A and B, with bits $A_j$ and $B_i$, the equations for deriving the sum word S with bits Si are:

$$S_0 = (A_0\char`\^ B_0)$$

$$S_1 = (A_1\char`\^ B_1)\char`\^(A_0 \& B_0)$$

$$S_2 = (A_2\char`\^ B_2)\char`\^(A_1 \& B_1\char`\^(A_0 \& B_0) \& (A_1\char`\^ B_1))$$

$$S_3 = (A_3\char`\^ B_3)\char`\^(A_2 \& B_2\char`\^(A_1 \& B_1\char`\^(A_0 \& B_0) \& (A_1\char`\^ B_1)) \& (A_2\char`\^ B_2))$$

. . .

where the characters "^", "+" and "&" are used for the logic operators XOR, OR, and AND respectively. The equations for the bits of the distance vector D are:

$$\begin{aligned}
D_0 &= K_0 \char`\^ K_0 \char`\^ R_0 \\
&= R_0 \\
D_1 &= K_1 \char`\^ (K_1 \char`\^ R_1) \char`\^ (K_0 \& R_0) \\
&= R_1 \char`\^ K_0 \& R_0 \\
D_2 &= K_2 \char`\^ (K_2 \char`\^ R_2) \char`\^ (K_1 \& R_1 \char`\^ K_0 \& R_0) \& (K_1 \char`\^ R_1) \\
&= R_2 \char`\^ (K_1 \& R_1 \char`\^ K_0 \& R_0 \& (K_1 \char`\^ R_1)) \\
D_3 &= K_3 \char`\^ (K_3 \char`\^ R_3) \char`\^ (K_2 \& R_2 \char`\^ (K_1 \& R_1 \char`\^ (K_0 \& R_0) \& (K_1 \char`\^ B_1)) \& (K_2 \char`\^ B_2)) \\
&= R_3 \char`\^ (K_2 \& R_2 \char`\^ (K_1 \& R_1 \char`\^ (K_0 \& R_0) \& (K_1 \char`\^ B_1)) \& (K_2 \char`\^ B_2))
\end{aligned}$$

. . .

Thus, it can be seen that the distance in column 0 is a function only of $R_0$ (i.e., is independent of the row number)

so that only one control is needed for column 0. The distance for column 1 is a function only of the least significant bit of the row number so that only two control values are needed: one for the odd rows and one for the even rows. In column 2, the distance is a function only of the lower two bits of the row number, so four different control values are needed. In general, column j requires $2^j$ different control values distributed such that each line which has the same lower j+1 bits has the same control value.

The M−1 control signals are labeled starting at index 1, so that C1 is the control bit for column 0, C2 and C3 are the control bits for column 1, and C4, C5, C6 and C7 are the control signals for column 2. In general, the control signals for a column j are the signals $C[2^j]\ldots C[2^{j+1}-1]$. In the FIG. 8 example, the upper buddy control signals are labeled $U_i$ and are set to be equal to the Ci values for rotation operations. The pair controls are labeled $L_i$ and provide the same control value for the buddy switch. The equations above are also used to define the truth table for the control signals, as illustrated in Table 5 for M=16.

illustrate 16 bit TBX circuits drawn using the "buddy" property and include the controls for the broadcast operation. Each block in these diagrams is a "toggle bus gate" consisting of two 2 to 1 multiplexers and an XOR gate. The building block circuit for this gate is shown in FIG. 7. Each buddy pair (upper circuit and buddy circuit) is now shown in a single box. This illustrates an "exchange shuffle" network which is particularly useful for implementing the TBX in custom integrated circuits. Specifically, each column and the associated wiring may be simply duplicated to realize the entire network. The FIG. 17 circuit is the same as the FIG. 16 circuit with the interior blocks moved to illustrate that the circuit may be partitioned into similar blocks.

Figure 18:
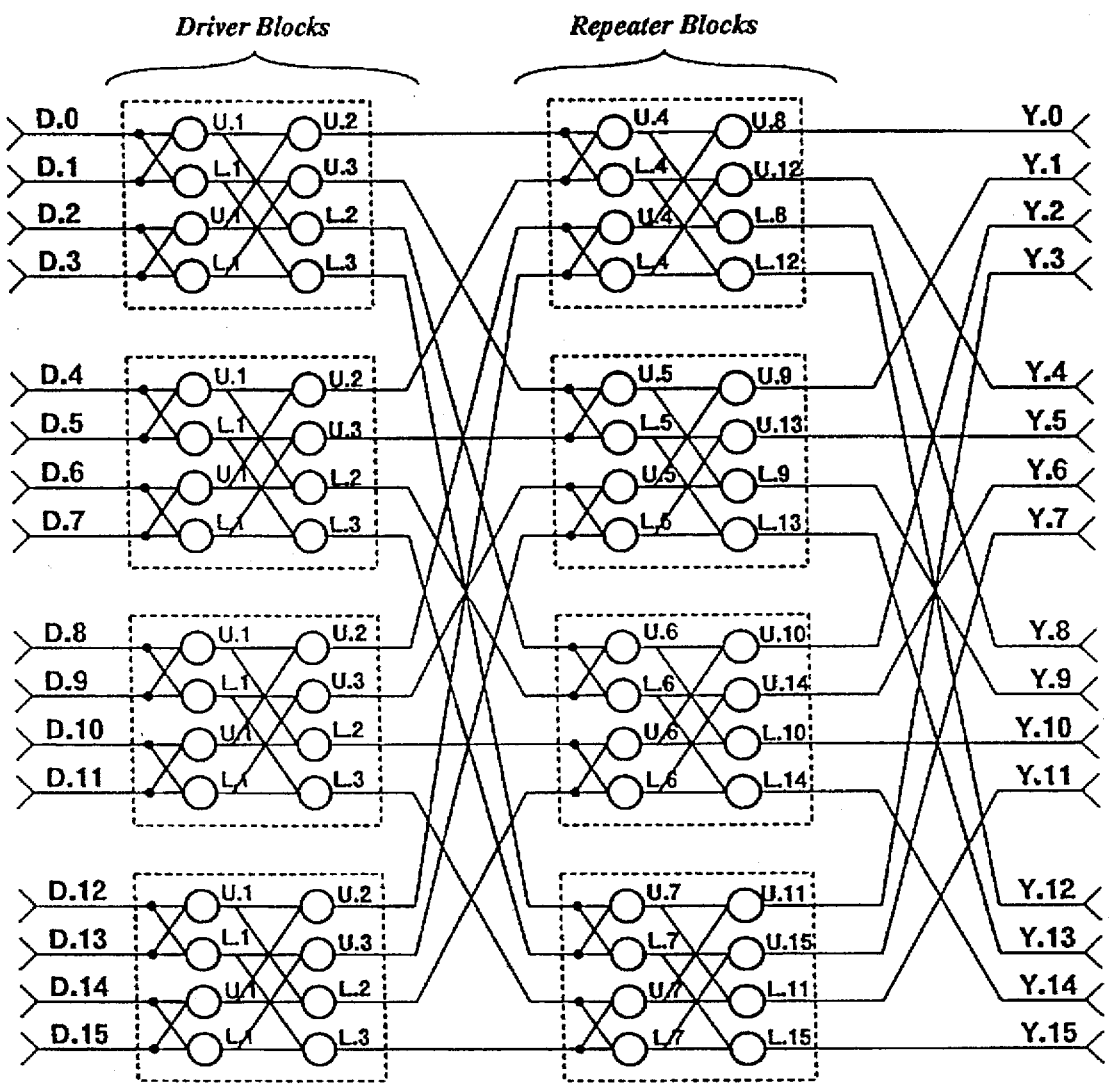
FIG. 18 illustrates, in switch circuit representation, how the FIGS. 16 and 17 TBX can be fully partitioned into eight 4-bit TBX circuits.
Figure 19:
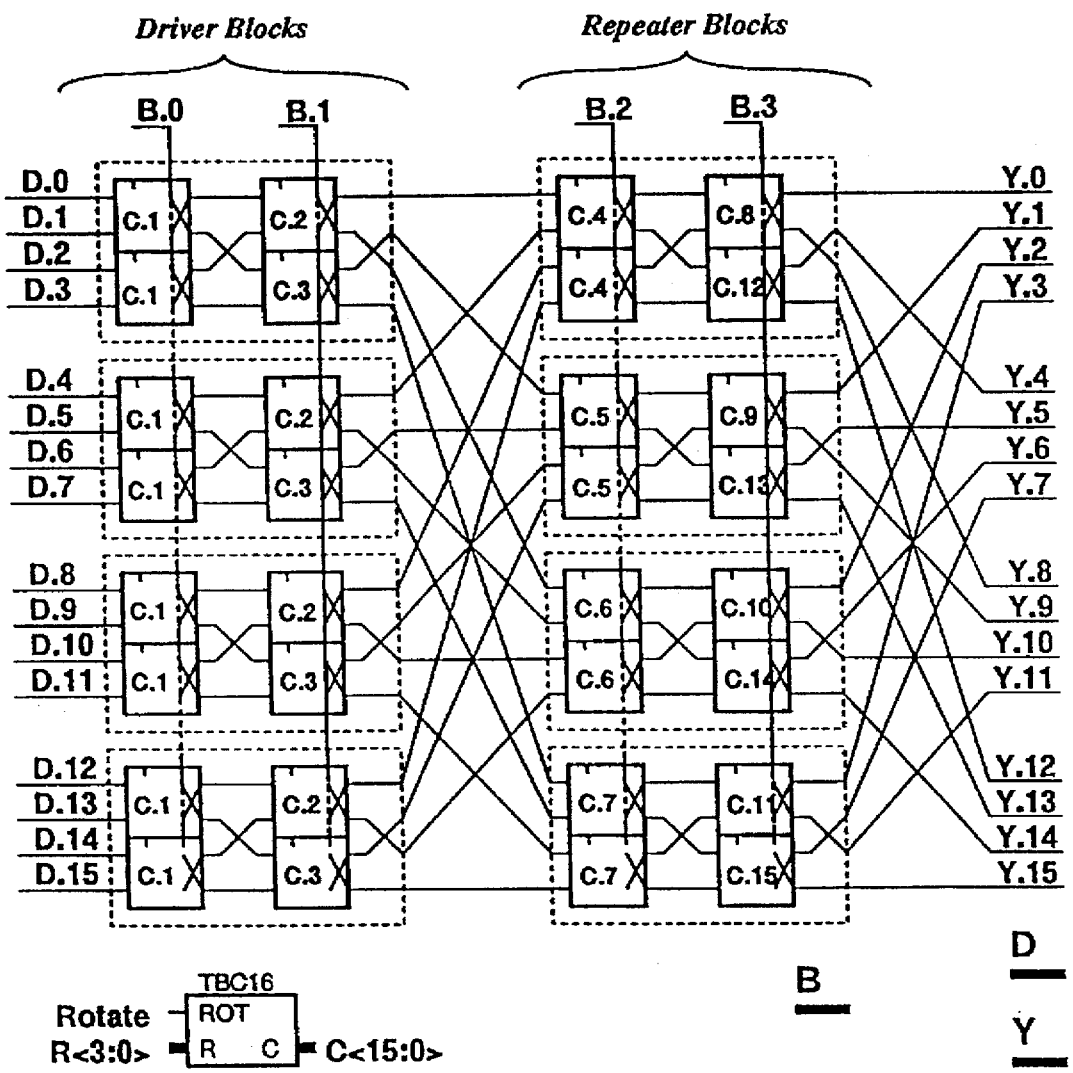
FIG. 19 illustrates, in buddy circuit representation, how the FIGS. 16 and 17 TBX can be fully partitioned into eight 4-bit TBX circuits.

The partitioning property of the TBX circuit is the basis for distributing the TBX circuit among several different components. The full partitioning of the 16-bit TBX circuit into eight 4-bit TBX circuits is shown in FIG. 18 using the switch circuit representation and in FIG. 19 using the buddy block representation. In general, an $M^2$ bit TBX circuit is

TABLE 5

Rotate Control Signals for a 16-bit TBX circuit

| R | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 0 | 0 | 0 | 0 | 0 | 0 | 0 | 0 | 0  | 0  | 0  | 0  | 0  | 0  |
| 1 | 1 | 1 | 0 | 1 | 0 | 0 | 0 | 1 | 0 | 0  | 0  | 0  | 0  | 0  | 0  |
| 2 | 0 | 1 | 1 | 1 | 1 | 0 | 0 | 1 | 1 | 0  | 0  | 0  | 0  | 0  | 0  |
| 3 | 1 | 0 | 1 | 1 | 1 | 1 | 0 | 1 | 1 | 1  | 0  | 0  | 0  | 0  | 0  |
| 4 | 0 | 0 | 0 | 1 | 1 | 1 | 1 | 1 | 1 | 1  | 1  | 0  | 0  | 0  | 0  |
| 5 | 1 | 1 | 0 | 0 | 1 | 1 | 1 | 1 | 1 | 1  | 1  | 1  | 0  | 0  | 0  |
| 6 | 0 | 1 | 1 | 0 | 0 | 1 | 1 | 1 | 1 | 1  | 1  | 1  | 1  | 0  | 0  |
| 7 | 1 | 0 | 1 | 0 | 0 | 0 | 1 | 1 | 1 | 1  | 1  | 1  | 1  | 1  | 0  |
| 8 | 0 | 0 | 0 | 0 | 0 | 0 | 0 | 1 | 1 | 1  | 1  | 1  | 1  | 1  | 1  |
| 9 | 1 | 1 | 0 | 1 | 0 | 0 | 0 | 0 | 1 | 1  | 1  | 1  | 1  | 1  | 1  |
| 10 | 0 | 1 | 1 | 1 | 1 | 0 | 0 | 0 | 0 | 1 | 1  | 1  | 1  | 1  | 1  |
| 11 | 1 | 0 | 1 | 1 | 1 | 1 | 0 | 0 | 0 | 0 | 1  | 1  | 1  | 1  | 1  |
| 12 | 0 | 0 | 0 | 1 | 1 | 1 | 1 | 0 | 0 | 0 | 0  | 1  | 1  | 1  | 1  |
| 13 | 1 | 1 | 0 | 0 | 1 | 1 | 1 | 0 | 0 | 0 | 0  | 0  | 1  | 1  | 1  |
| 14 | 0 | 1 | 1 | 0 | 0 | 1 | 1 | 0 | 0 | 0 | 0  | 0  | 0  | 1  | 1  |
| 15 | 1 | 0 | 1 | 0 | 0 | 0 | 1 | 0 | 0 | 0 | 0  | 0  | 0  | 0  | 1  |

Figure 14:
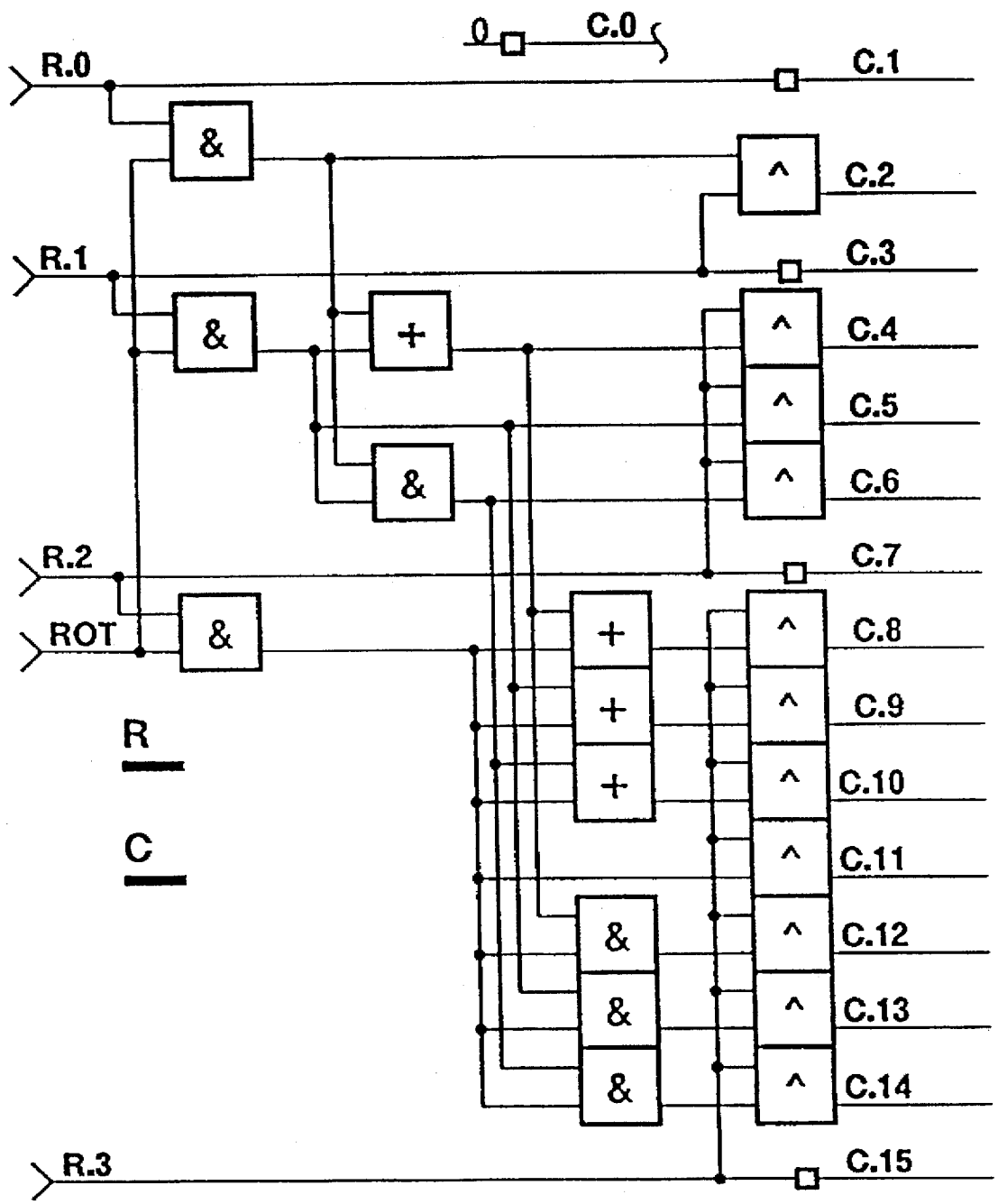
FIG. 14 illustrates an example control circuit for controlling the FIG. 8 TBX to have both reflection and rotation capability.
Figure 15:
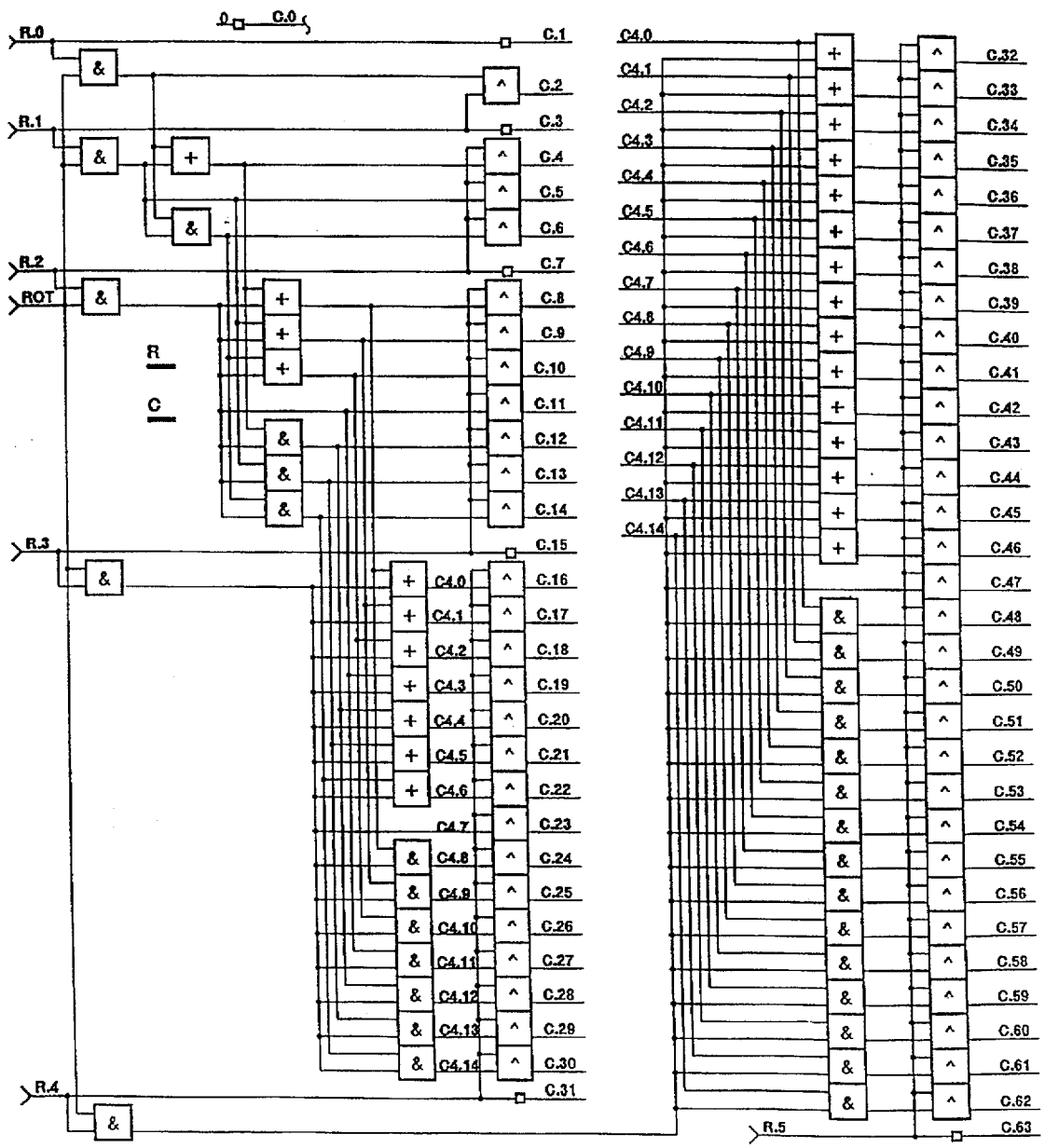
FIG. 15 illustrates an extension of the FIG. 14 control circuit, for M=64.

For example, the C2 control in the table implements the equation C2=R1^R0(K0=1) and the C3 control implements the equation C3=1 (K0=0). Each column in Table 5 implements a variation of the digital function called the "bargraph" function. The bargraph function is the basis for the rotate control circuit in the toggle bus transceiver. FIG. 14 illustrates an example control circuit for a TBX having both reflection and rotation capability. The ROT signal enables rotation controls with value "1". When the ROT signal has value "0", the control for each column is just the value of the corresponding reflection index. In general, an M bit TBX circuit can be implemented in M/2−1 AND gates, M/2−Lg (M) OR gates and M−Lg(M)−1 XOR gates, so the circuit has linear cost with the size of the network M. In contrast, the TBX circuit has a fundamental cost of M Lg(M) switches. The basic pattern of this circuit is easily extended for any value of M. FIG. 15 illustrates the control circuit for M=64 which includes the circuits for M=32, M=16 and all smaller values of M.

Figure 16:
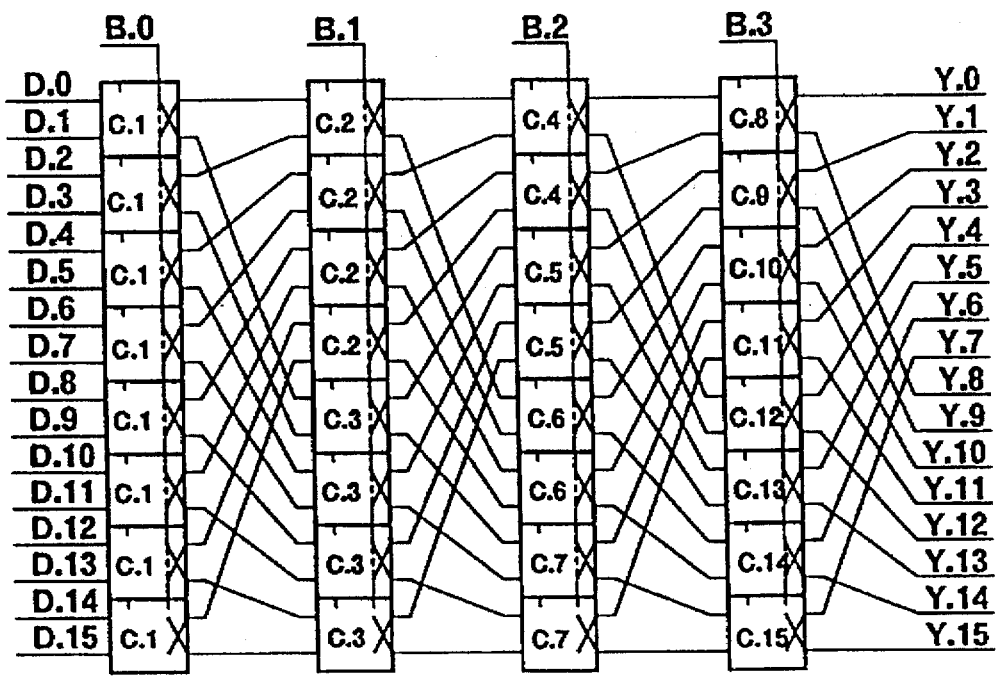
FIG. 16 illustrates a 16 bit TBX circuit in exchange shuffle representation.
Figure 17:
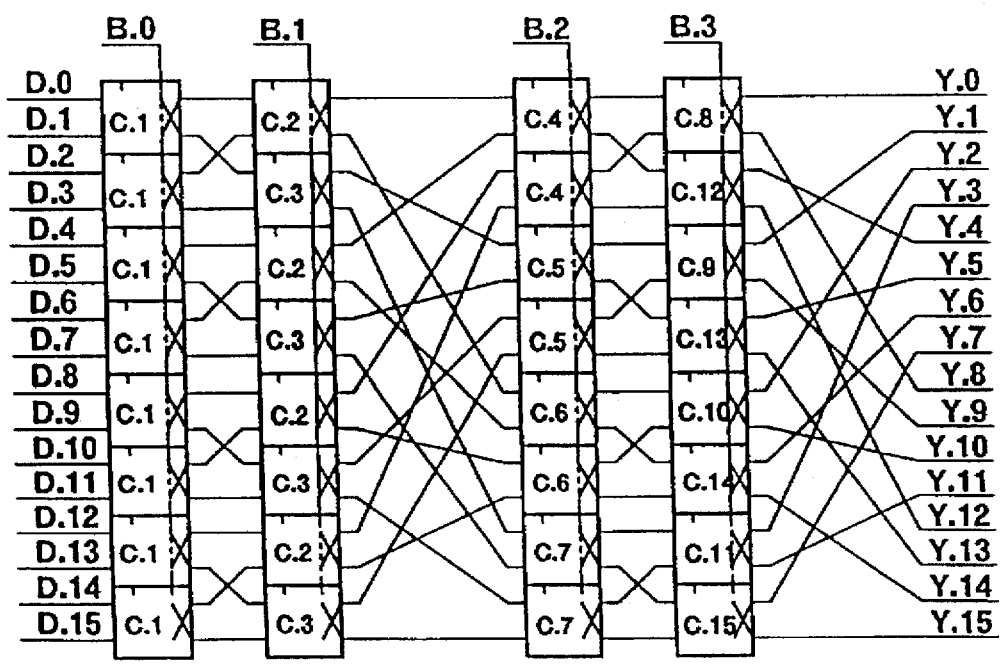
FIG. 17 illustrates the FIG. 16 TBX circuit in exchange distance representation.

There are many permutations of the TBX circuit which have the same capabilities as the ones shown in the previous examples. In particular, any permutation of the columns is still a TBX circuit if appropriate modifications are made to the control circuits. Further, the TBX circuit can be drawn differently to illustrate different properties. FIGS. 16 and 17 realized using a column of M-bit TBX circuits in the left column called the "driver" blocks and M-bit TBX circuits in the right column called the "repeater" blocks. A total of M drivers and M repeaters are needed in each column. A crucial property of the partitioning is that the wiring between the two columns is the same as the wiring between the second column and the output line points. In particular, this wiring pattern is the perfect shuffle pattern previously described.

To implement a large network using smaller blocks, the switch control circuitry must also be partitioned. Doing so is simple for the reflection and broadcast controls since all the switches in a given column have the same control value. However, the rotation operation controls are more complicated. As illustrated in the partitioning examples, the "driver" column blocks have the same control signals for each block, so partitioning the driver switch controls is relatively simple. However, the control signal required for rotation by a particular repeater block depends on the position of the repeater block in the column. For mass production it is desirable to have the same circuit used to implement each block. This can be resolved by including an ability to "pin program" each repeater block so that a block identifier can be used to create different control signals using the same circuit.

Figure 20:
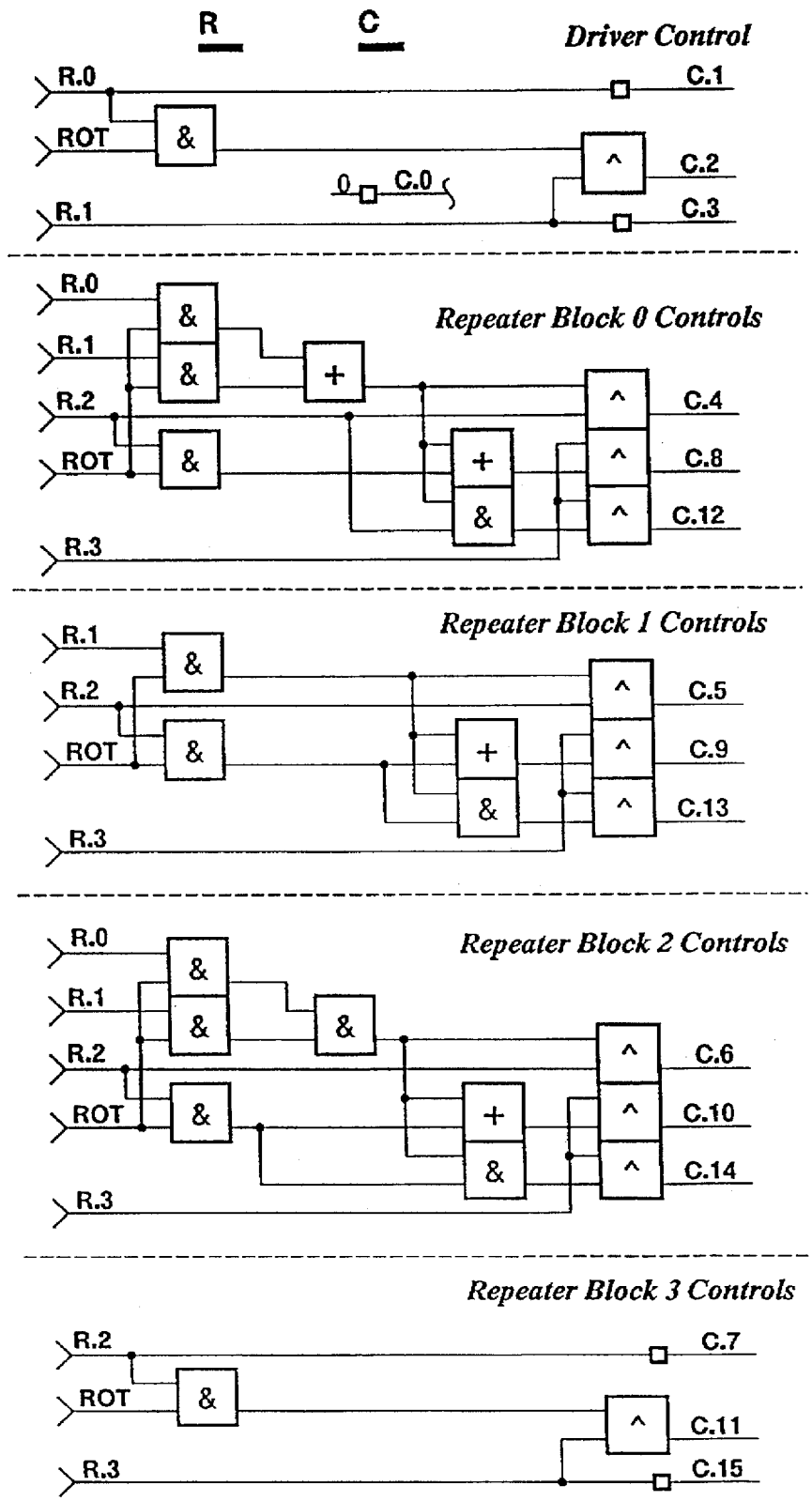
FIG. 20 illustrates control circuits for five block types (one driver block type and four different repeater blocks) for a 4 by 4 system.

FIG. 20 illustrates the different control circuits which would be required for the five block types (one driver block type and four different repeater blocks) for a 4 by 4 system if the block identifier circuitry were not implemented. The solution for the toggle bus system is derived from the observation that the block 3 circuit is the same as the driver control circuit and is of simple form. Table 6 illustrates the truth table for each block.

TABLE 6

Control Groups for a 16-bit system with 4 bits per Node

| | D | | | 0 | | | 1 | | | 2 | | | 3 | | |
|---|---|---|---|---|---|---|---|---|---|---|---|---|---|---|---|
| R | 1 | 2 | 3 | 4 | 8 | 12 | 5 | 9 | 13 | 6 | 10 | 14 | 7 | 11 | 15 |
| 0  | 0 | 0 | 0 | 0 | 0 | 0 | 0 | 0 | 0 | 0 | 0 | 0 | 0 | 0 | 0 |
| 1  | 1 | 1 | 0 | 1 | 1 | 0 | 0 | 0 | 0 | 0 | 0 | 0 | 0 | 0 | 0 |
| 2  | 0 | 1 | 1 | 1 | 1 | 0 | 1 | 1 | 0 | 0 | 0 | 0 | 0 | 0 | 0 |
| 3  | 1 | 0 | 1 | 1 | 1 | 0 | 1 | 1 | 0 | 1 | 1 | 0 | 0 | 0 | 0 |
| 4  | 0 | 0 | 0 | 1 | 1 | 0 | 1 | 1 | 0 | 1 | 1 | 0 | 1 | 1 | 0 |
| 5  | 1 | 1 | 0 | 0 | 1 | 1 | 1 | 1 | 0 | 1 | 1 | 0 | 1 | 1 | 0 |
| 6  | 0 | 1 | 1 | 0 | 1 | 1 | 0 | 1 | 1 | 1 | 1 | 0 | 1 | 1 | 0 |
| 7  | 1 | 0 | 1 | 0 | 1 | 1 | 0 | 1 | 1 | 0 | 1 | 1 | 1 | 1 | 0 |
| 8  | 0 | 0 | 0 | 0 | 1 | 1 | 0 | 1 | 1 | 0 | 1 | 1 | 0 | 1 | 1 |
| 9  | 1 | 1 | 0 | 1 | 0 | 1 | 0 | 1 | 1 | 0 | 1 | 1 | 0 | 1 | 1 |
| 10 | 0 | 1 | 1 | 1 | 0 | 1 | 1 | 0 | 1 | 0 | 1 | 1 | 0 | 1 | 1 |
| 11 | 1 | 0 | 1 | 1 | 0 | 1 | 1 | 0 | 1 | 1 | 0 | 1 | 0 | 1 | 1 |
| 12 | 0 | 0 | 0 | 1 | 0 | 1 | 1 | 0 | 1 | 1 | 0 | 1 | 1 | 0 | 1 |
| 13 | 1 | 1 | 0 | 0 | 0 | 0 | 1 | 0 | 1 | 1 | 0 | 1 | 1 | 0 | 1 |
| 14 | 0 | 1 | 1 | 0 | 0 | 0 | 0 | 0 | 1 | 0 | 1 | 1 | 0 | 1 | 0 |
| 15 | 1 | 0 | 1 | 0 | 0 | 0 | 0 | 0 | 0 | 0 | 0 | 1 | 0 | 1 | 0 |

The truth tables for groups 0, 1, and 2 are the same as for group 3, except for an offset in rotation by the amount of the group ID (0, 1, 2, or 3) minus 3. For example, the controls for group 0 are the same as for group 3 but shifted up by three. In general, for a system using M-bit circuits, the rotation controls for repeater block M−1 is the same as for the driver block, and the controls for repeater block j are same as for repeater block M−1 with the amount (M−(j−1)) added to the rotation index.

Figure 21:
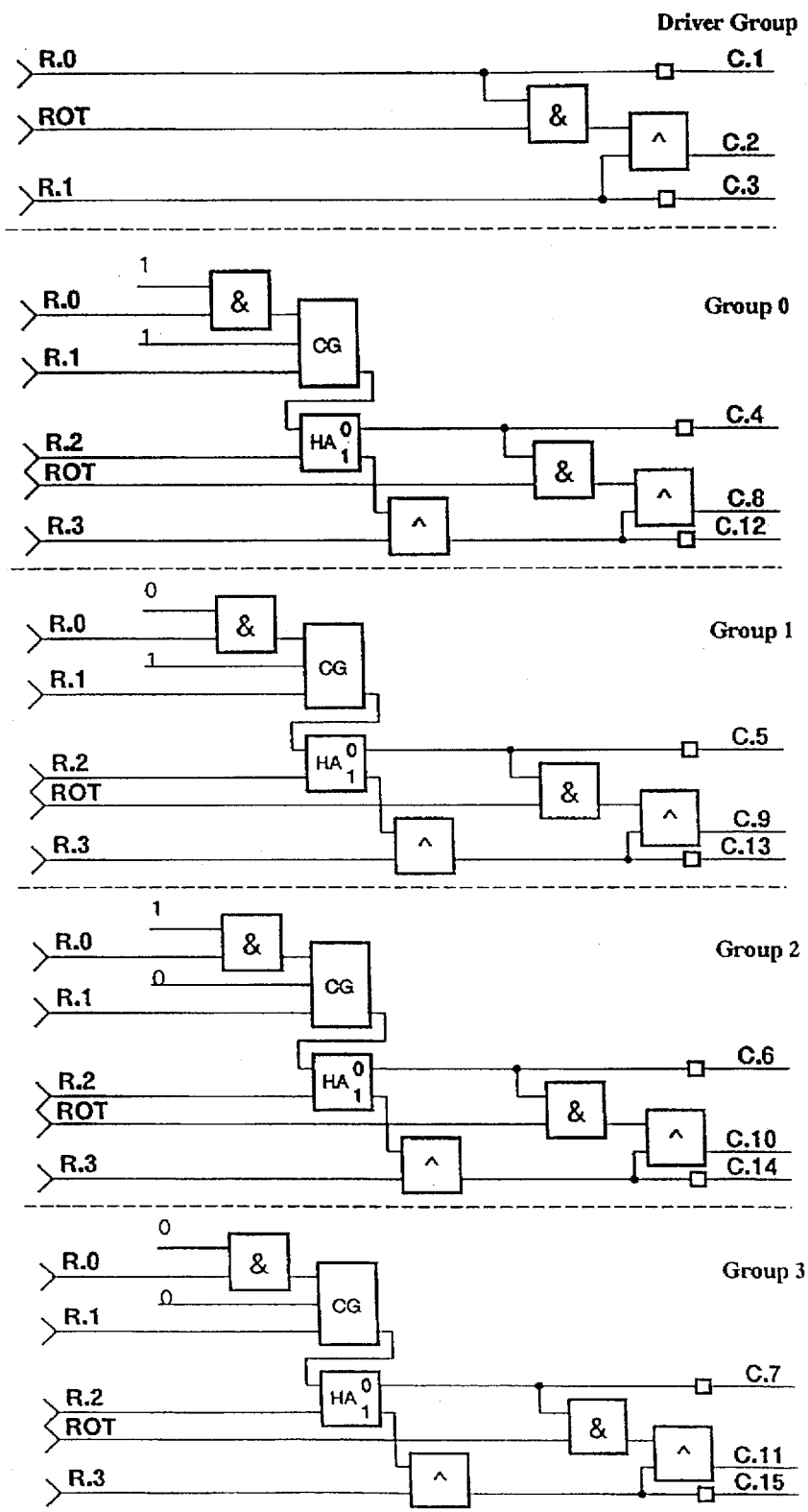
FIG. 21 illustrates the FIG. 20 control blocks in a general form.

FIG. 21 illustrates how an identical control block can be used to each generate the different controls required for each repeater block. Specifically, as discussed above, circuitry is provided to add the ones complement of the group identifier to the rotation index. This is equivalent to adding (M−(j−1)) to the rotation index.

Figure 22:
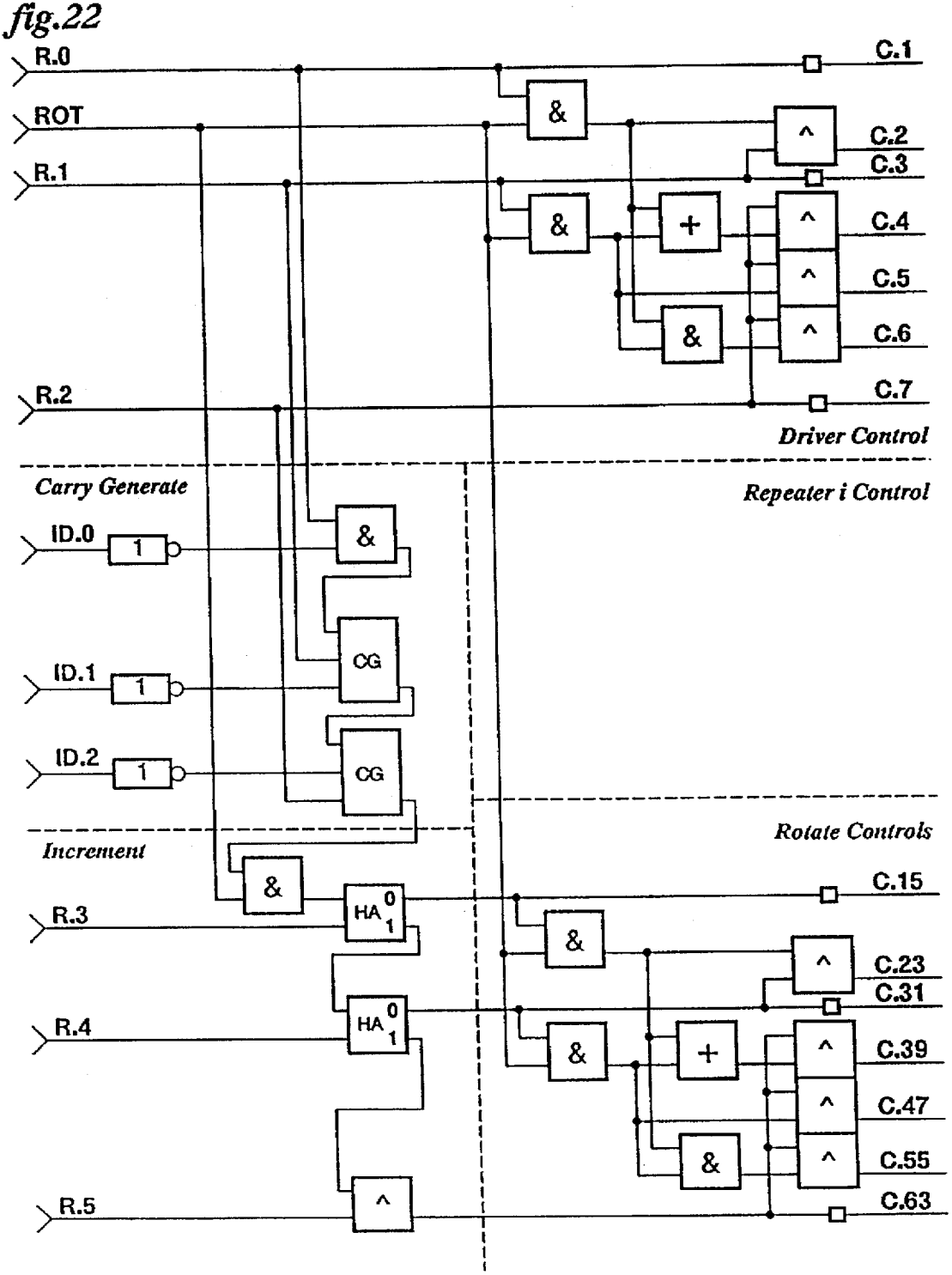
FIG. 22 illustrates the structure of a partitioned control block for an 8-bit TBX block.

The full structure of the partitioned control block scheme is more clearly seen for the case of 8-bit TBX block shown in FIG. 22. The upper section is the driver block control, which is a function of only the lower three bits of the rotation index. The lower section is the general repeater control block with identifier input "ID". The repeater control block implements three distinct functions:

(1) a carry generate circuit which adds the ID to the lower three bits of the rotation index;

(2) an increment circuit which increases the value of the upper three bits of the rotation index if the sum of the ID and the lower three bits has a value greater than 7; and (3) an eight bit rotation control circuit which has the same structure as for the driver group except that the rotation input vector is the conditionally incremented value of the upper three bits of the input rotation index.

Toggle Bus Circuits

A toggle bus system includes system components into which driver and repeater partition blocks are embedded into the standard bus interface. Alternately, these blocks are implemented as components which are external to the system components. A full toggle bus system includes both driver and repeater blocks for each node (i.e., connection of a particular system component to the toggle bus). A component that needs only word level capabilities need only include a repeater block.

Fundamentally, the toggle bus work includes a set of wires (having the perfect shuffle connection) which connects the driver blocks to the repeaters blocks. This same set of wires also connects the outputs of the repeater blocks back to the data source. Since a wire can only carry information in one direction at a time, each data transaction operation is split into two phases:

(1) the driver phase $\phi 0$ uses the wires to transfer the "bit permuted" data from the output of the driver blocks to the inputs to the repeater blocks and (2) the repeater phase $\phi 1$ transfers the "word permuted" data from the output of repeater blocks back to the driver blocks.

Each repeater block includes a storage register, known as the toggle bus register, to hold the bit permuted data. Referring to the FIG. 2 example, the type "B" system implements the partitioned network using only one set of perfect shuffle wires.

Figure 23:
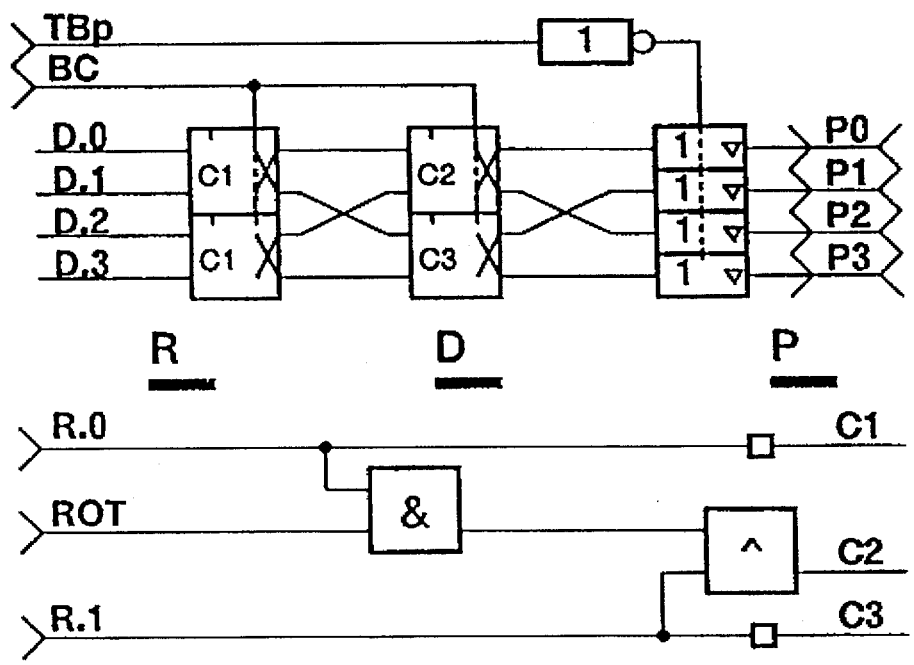

The simplest circuit is the toggle bus driver block which is essentially an M-bit toggle bus exchange circuit with rotation and broadcast control operating on the lower Lg(M)/2 bits of the reflection, rotation or broadcast index. This is shown in FIGS. 23 and 24 for the case of M=4 and M=8. Tristate drivers controlled by the toggle bus phase signal "TBp" allow the output of the driver block to be driven to the "P" bus wires. The input "D" to the TBX circuit is where the source data is provided from the system component.

Figure 25:
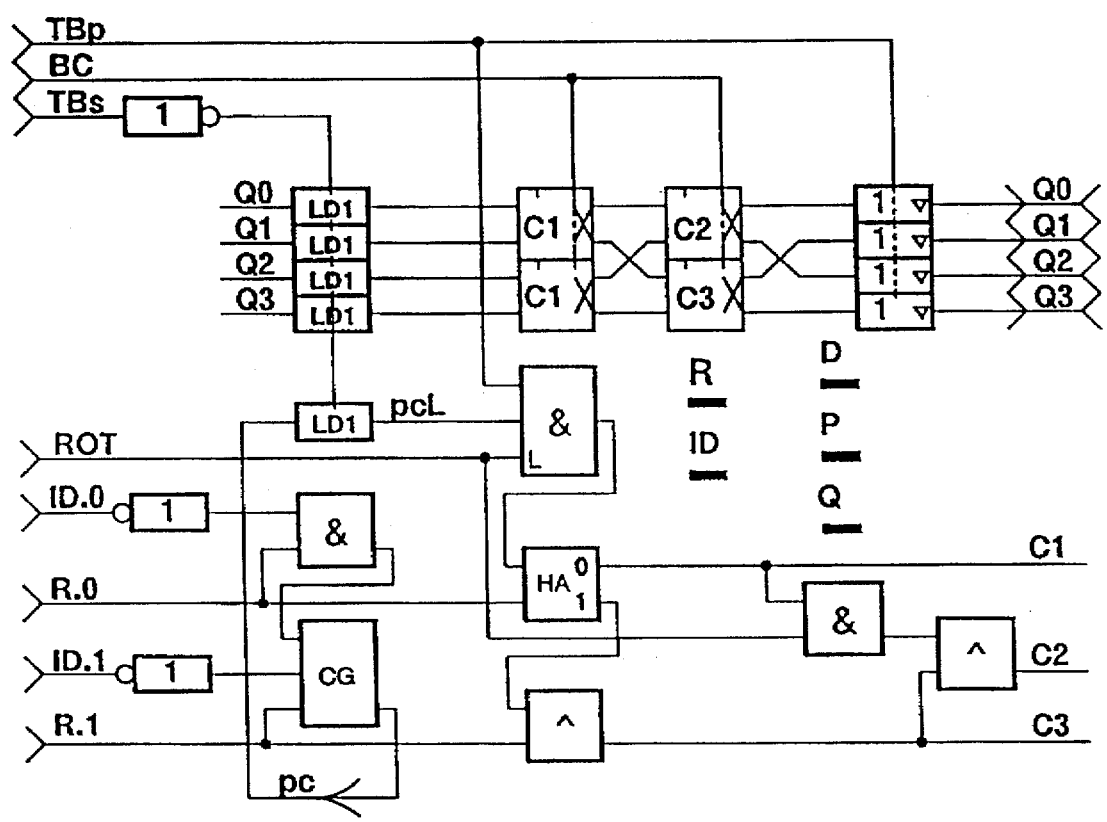
FIGS. 25 and 26 show a toggle bus repeater (TBR), in partitioned form, for M=4 and M=8, respectively.
Figure 26:
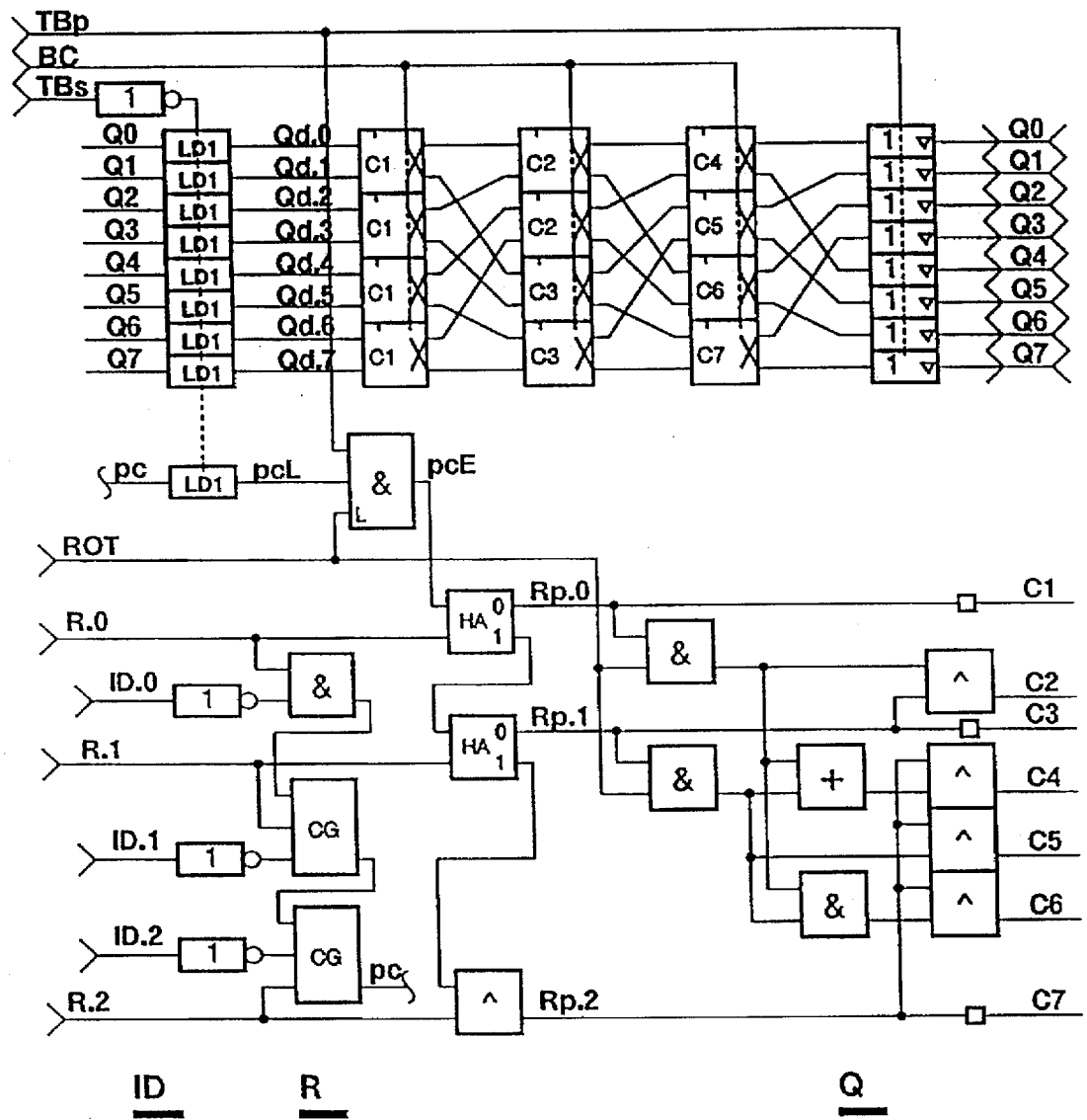

A toggle bus repeater block implements the partitioned repeater block and partitioned control circuit. Tristate drivers are provided for the return data and transparent latch circuits are provided as the toggle bus register. This is illustrated in FIGS. 25 and 26 for the cases of M=4 and M=8. The toggle bus register is loaded responsive to the toggle bus strobe signal "TBs". The increment action is gated by the rotate control signal "ROT" so that the R index values are not modified if the repeater phase operation is a broadcast or reflection operation. The R index values are split into lower and upper bits. To reduce the number of control signals in the system, only the lower Lg(M)/2 bits are provided during the driver phase and only the upper Lg(M)/2 bits are transmitted over the same wires during the repeater phase. The output of the carry generate circuit in the repeater is generated during the driver phase and is retained in a storage latch for use during the repeater phase. The input to the toggle bus register is from the "Q" bus bi-directional inputs which are connected to the "P" bus outputs of the driver blocks by the perfect shuffle wiring. The toggle bus register drives the toggle bus exchange circuit, which returns the word level permuted data back through the "Q" bus lines during the repeater phase.

Figure 27:
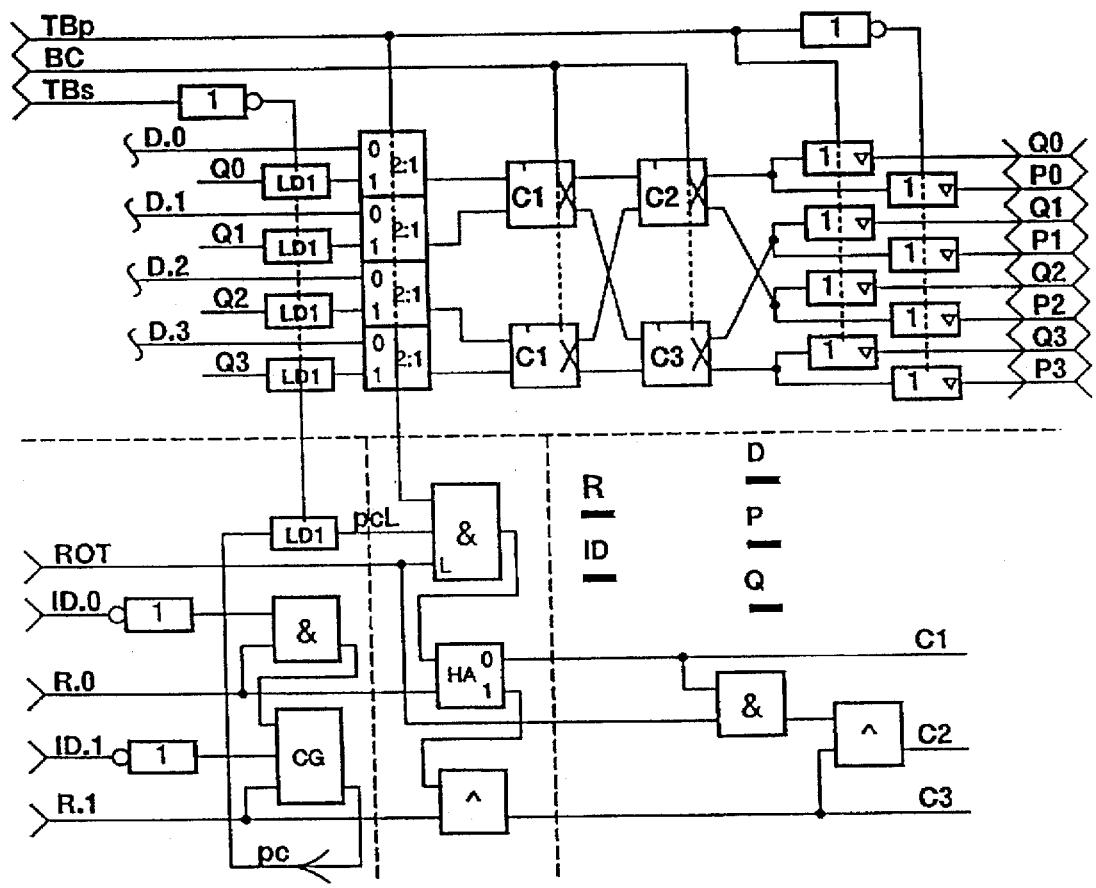
FIGS. 27, 28 and 29 show a toggle bus transceiver (TBT), in partitioned form, for M=4, M=8, and M=16, respectively.
Figure 28:
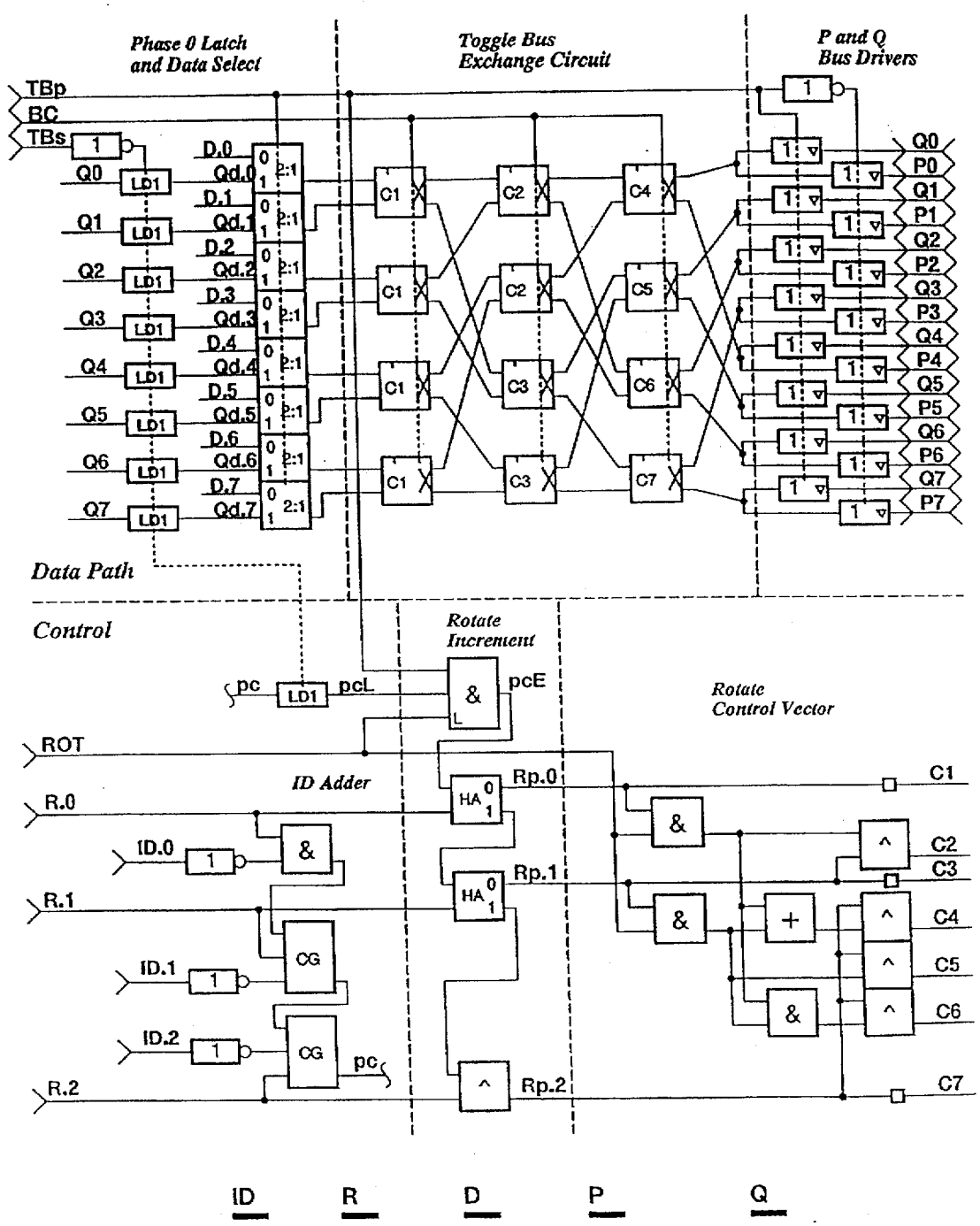
Figure 29:
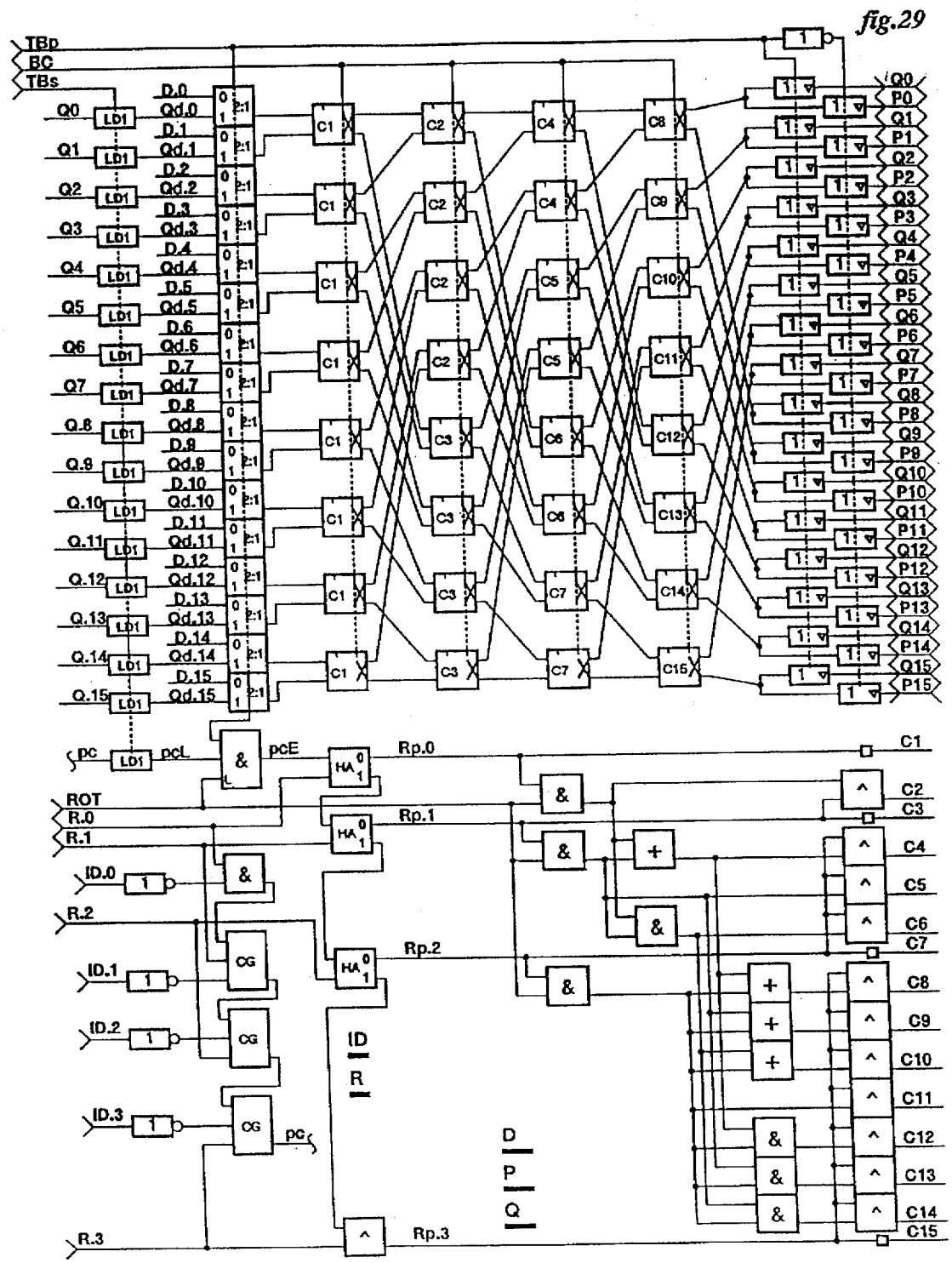

For a system component which requires both a driver block and a repeater block, these two circuits may be combined. Examples of such combined circuits are the toggle bus transceiver (TBT) circuits shown in FIGS. 27, 28 and 29 for the cases M=4, M=8, and M=16. The combination of the driver and repeater circuitry is possible for two reasons:

(1) by judicious selection of the control circuit for the repeater block, both the TBX and most of the control circuit is the same for both the driver and repeater blocks, and (2) the driver TBX circuit and associated control is used only during the driver phase whereas the TBX and control for the repeater is used only during the repeater phase.

The same TBX and control circuit can be time multiplexed for use during both phases of operation. For this purpose, two to one multiplexers, controlled by the toggle bus phase signal, are provided so that the "D" lines drive the TBX during the driver phase and the toggle bus register drives the TBX during the repeater phase. Two sets of tristate drivers are provided. The "P" bus drivers are active during the driver phase and the "Q" bus drivers are active during the repeater phase. The common control block includes a gate which disables the rotation increment operation during the driver phase (the three input AND gate). The time multiplexed R index receives the lower bits during the driver phase and the upper bits during the repeater phase. Thus, this TBT system has the ability to have different data permutation modes in the driver and repeater phases.

Example System Use

Figure 30:
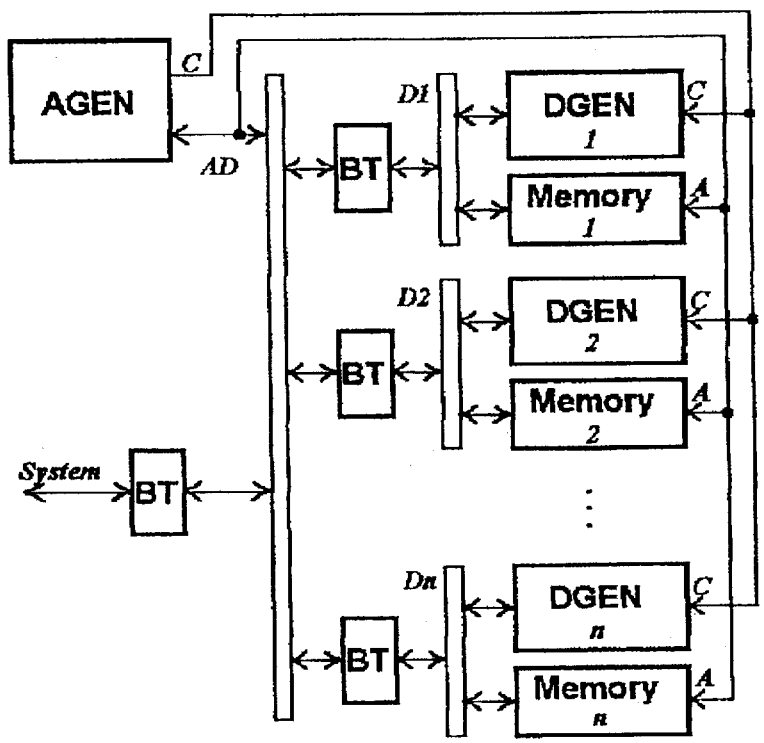
FIG. 30 shows a prior art graphics system as disclosed in U.S. Pat. No. 4,882,683.

As discussed below, the use of the Toggle Bus is shown to improve the performance of a prior art computer graphics generation system disclosed in U.S. Pat. No. 4,882,683, entitled "Cellular Addressing Permutation Bit Map Raster Graphics Architecture" and issued to the inventor of the present invention on Nov. 21, 1989. FIG. 30 illustrates the structure of the prior art system graphics generation system which consists of a single address generator component (labelled AGEN) and of a plurality of data generator components (labelled DGEN). Associated with each DGEN component is a set of memory components (shown as Memory 1, Memory 2 and so forth in FIG. 30) for storing an image in bit-map graphics format.

In the FIG. 30 system, each DGEN and associated memory includes an exchange circuit for permuting data in the memory components in order to allow access to the bit map image in any of a variety of addressing modes. Each DGEN in the FIG. 30 system implements control and data manipulation circuitry for a restricted number of planes of the image. Taken together, several DGEN and memory component sets support image manipulation with a large number of bits per pixel. Significantly, the interconnection of the components in the prior art system required the use of several Tristate buses with Tristate Bus Transceivers (shown as BT in the drawing) to interconnect the buses. This structure allows for the use of the full concurrent bandwidth of the memory and DGEN components for pixel manipulation. The AGEN component distributes address information to the data memories using the AD bus and distributes control information to the DGEN components using the C bus. Instruction and control information is transferred to and from the system using additional bus transceiver components.

The structure of the FIG. 30 system requires significant cost for interconnect because of the need for a large number of external bus transceiver components. The prior art system has a significant deficiency in that data cannot not be transferred between the DGEN components at high speed. Further, the data permutation capabilities of each DGEN component cannot be extended to several components, thus limiting the ways by which data can be modified. For example, with two DGEN components, the system is constrained to always use at least two bits per pixel in the image data manipulation; there is no simple means for manipulating the data between the two bits of each pixel.

Figure 31:
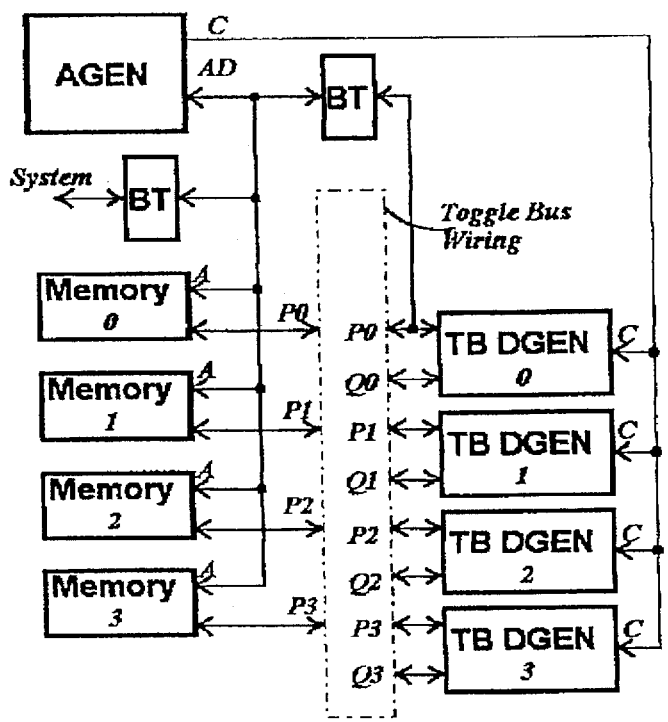
FIG. 31 shows an improved graphics system which has graphics memories connected by a Toggle Bus system.

An improved graphics system using the novel Toggle Bus interconnect scheme is illustrated in FIG. 31. FIG. 30 illustrates a system which includes four modified data generator components (labelled as TB DGEN in the drawing). However, as many as M components can be used, with M bits per word. The illustrated system uses the "type A" structure (FIG. 1) in which each TBDGEN component includes a full Toggle Bus Transceiver circuit. The system needs only two external bus transceiver components which allow the connection of the AGEN and the Toggle Bus structure, and to connect the AGEN to the system. In the operation of this improved system, data is transferred from the memories on the P bus connections to the DGEN components. This transferred data is then permuted over the Toggle Bus according to the current addressing mode of the system. The Toggle Bus transceiver circuits perform the same function as the data exchange circuits of the FIG. 30 system. However, relatived to the FIG. 30 system, data is transferred at high speed between the DGEN components, and the set of DGEN components taken together now allow provide the capability for extended pixel manipulation such that all of the data of the bus may be treated as a single cell of the memory. In addition to saving cost, the FIG. 31 system allows the use of addressing modes not available in the FIG. 30 system.

Figure 32:
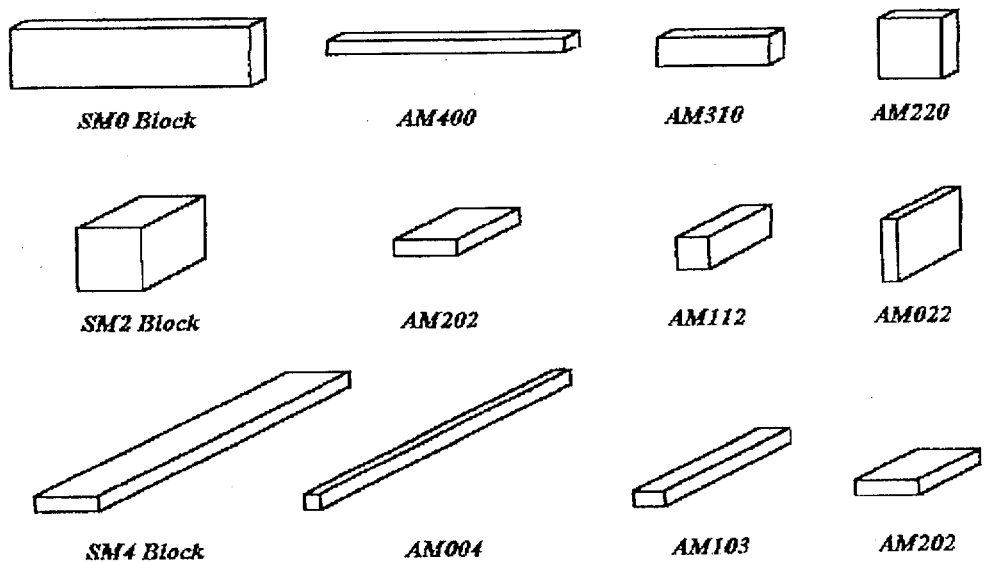
FIG. 32 shows allowed addressing modes for the FIG. 30 system for the case of one DGEN component.

For this discussion, each DGEN component is assumed to have M=16 bits per word. The allowed addressing modes for the FIG. 31 system are illustrated in FIG. 32 for the case of one DGEN component. The FIG. 31 system allows several sets of address modes to be used according to the static mode which defines the number of bits in each pixel of the image. For example, in static mode 0 (denoted as SM0) there is only one bit per pixel. In this case, the memory is organized as a set of image blocks having width (the X coordinate) of 16 bits and height (the Y coordinate) of 4 bits. Each addressing mode then allows a 16 bit subset of this block to be modified in one memory cycle. For example, address mode AM400 allows operations on a horizontal cell of 16 by 1 bits, while address mode AM220 in the figure allows operations on a 4 by 4 bit cell. The numbers for each mode correspond to the logarithm base 2 of the number of bits in the X, Y and Z coordinates. For example, 1 bit has mode digit 0, 2 bits has mode digit 1, 4 bits has mode digit 2 and so forth. Consequently, address mode AM310 has 8 horizontal pixels, 2 vertical pixels and 1 bit per pixel. Other static modes are allowed in the prior art device to increase the number of bits per pixel. For example, in static mode SM4, each pixel has 16 bits and the addressing modes are constrained to have a minimum of 4 bits per pixel. The addressing modes are discussed fully in U.S. Pat. No. 4,882,683.

Figure 33:
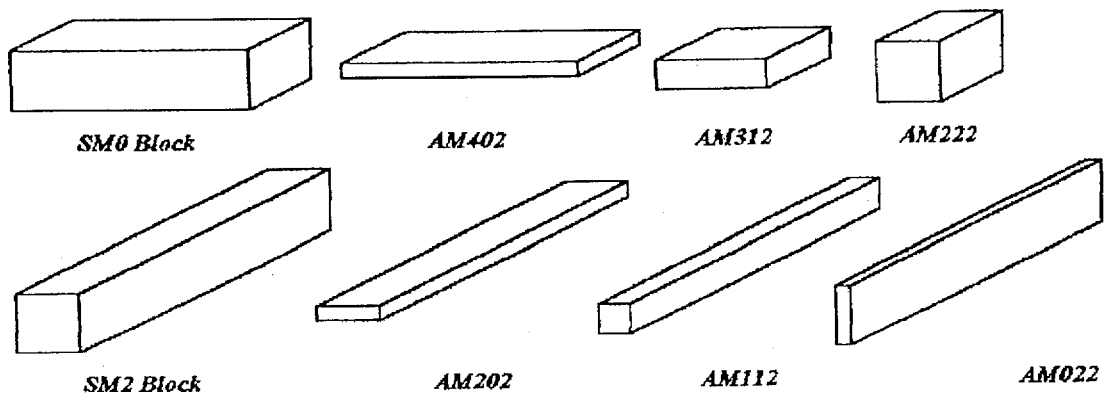
FIG. 33 shows allowed addressing modes for the FIG. 30 system for the case of four DGEN components.

Additional memory addressing capabilities are provided in the FIG. 30 system when several components are used together. But, as illustrated in FIG. 33, this extension allows only an increase in the number of bits per pixel. Further, no bit operations are possible between DGEN data in a single memory cycle. This significantly constrains the range of imaging algorithms.

In the improved system (FIG. 31), the Toggle bus Exchange circuits of several components operate together as a single larger exchange circuit. Consequently, all of the data bits on the Toggle Bus may be conceptually viewed as a single cell of a memory block. This allows the full range of addressing modes in the improved system as shown in FIG. 34. For example, if four components are used with 16 bits of data per unit, then addressing modes are available to treat memory as a single plane (one bit per pixel) or 16 planes (with 16 bits per pixel). The number of possible addressing modes increases in proportion to the number of components on the Toggle Bus. For example, in a system with 16 bits per word and 16 components, there are a total of 256 bits which may be modified in a single bus cycle. The addressing modes in this case include AM440(16 by 16 pixels with 1 bit per pixel), AM404(16 by 1 pixels with 16 bits per pixel) and AM224 (4 by 4 pixels with 16 bits per pixel).

A further improvement of the Toggle Bus based graphics system involves the use of all the data flow patterns available on the bus. The broadcast dataflow allows the AGEN or any other DGEN component to send data to all of the other components in one bus cycle. Also, the combination of the reflection and rotation data flow patterns of the Toggle Bus transceivers may be used to reduce the internal complexity of the DGEN components. As described in the U.S. Pat. No. 4,882,683, both exchange circuits and rotator circuits are needed to perform the internal data manipulation functions. In the improved system, these functions are performed directly by the Toggle Bus transceiver circuit.

What is claimed is:

1. A bus transceiver system for transfer of data among a plurality (N) of system components ($CC_i$, for i=0 through N−1), each of said system components having a plurality (M) of bits ($S_{i,j}$, j=0 through M−1), said system comprising:
   A) N toggle bus transceiver circuits ($TBT_i$, for i=0 through N−1), each of said N toggle bus transceiver circuits corresponding to a respective one of the system components and including
      i) bi-directional driver circuitry having
         a) M first terminals ($D_{i,j}$, for j=0 through M−1), each of said M first terminals coupled to a respective bit of the system component to which the toggle bus transceiver circuit corresponds;
         b) M second terminals ($P_{i,j}$); and
         c) driver switch circuitry that selectively connects each of said M first terminals to at least one of said M second terminals, wherein,
            in a first mode and for each of said M first terminals, said bi-directional driver circuitry drives, to the at least one of said second terminals to which said first terminal is selected to be connected, a signal from the bit to which said first terminal is coupled, and
            in a second mode and for each of said M first terminals, said bi-directional driver circuitry drives, from the at least one of said second terminals to which said first terminal is selected to be connected, a data signal provided at said at least one second terminal to the bit to which said first terminal is coupled, and
      ii) repeater circuitry having
         a) M third terminals ($Q_{i,j}$);
         b) M latch circuits ($L_{i,j}$); and
         c) repeater switch circuitry that selectively connects each of said M third terminals to at least one of said latch circuits, wherein said latch circuit is for
            in the first mode, latching a data signal provided at said third terminal to which said latch circuit is connected, and
            in the second mode, providing a data signal latched by said latch circuit to said third terminal to which said latch circuit is connected; and
   B) a permuted interconnect network that couples the second terminals of the toggle bus transceiver circuit bi-directional driver circuitry to the third terminals of the toggle bus transceiver circuit repeater circuitry for permuted signal transfer therebetween.

2. The bus transceiver system of claim 1, wherein M=N and the permuted interconnect network implements a perfect shuffle connection such that the j-th second terminal of the bi-directional driver circuit of the toggle bus transceiver corresponding to the i-th system component is connected to the i-th third terminal of the repeater circuitry of the toggle bus transceiver corresponding to the j-th system component.

3. The bus transceiver system of claim 1, wherein M>N and the permuted interconnect network implements a perfect shuffle connection such that the j-th second terminal of the bi-directional driver circuitry of the toggle bus transceiver corresponding to the i-th system component is connected to the ((j div N)·(M div N)+i)-th third terminal of the repeater circuitry of the toggle bus transceiver corresponding to the (j mod N)-th system component.

4. The bus transceiver system of claim 1, wherein each of said driver switch circuitry is identical to each other said driver switch circuitry.

5. The bus transceiver system of claim 4,
   wherein each said driver switch circuitry includes driver switch control circuitry that receives at least one driver input control signal and, during the first mode, generates a respective driver switch control signal in response thereto, and
   wherein said each said driver switch circuitry selectively connects each of said M first terminals to at least one of said M second terminals responsive to said respective driver switch control signal.

6. The bus transceiver system of claim 5,
   wherein each said driver switch circuitry further includes identifier receiving circuitry that receives a unique respective identifier, and
   wherein said each said driver switch circuitry generates said driver switch control signal responsive to both said input control signal and said unique respective identifier.

7. The bus transceiver system of claim 1, wherein each of said repeater switch circuitry is identical to each other said repeater switch circuitry.

8. The bus transceiver system of claim 7,
   wherein each said repeater switch circuitry includes repeater switch control circuitry that receives at least one repeater input control signal and, during the first mode, generates a respective repeater switch control signal in response thereto, and wherein each said repeater switch circuitry selectively connects each of said M first terminals to at least one of said M second terminals responsive to said respective repeater switch control signal.

9. The bus transceiver system of claim 8, wherein each said repeater switch circuitry further includes identifier receiving circuitry that receives a unique respective identifier, and wherein each said repeater switch circuitry generates said repeater switch control signal responsive to both said input control signal and said unique respective identifier.

10. A bus transceiver circuit for use with a first system component for transfer of data among the first system component and other system components, each of said system components having a plurality (M) of bits, said bus transceiver circuit comprising:

A) exchange circuitry that includes M first terminals and M second terminals, and that selectively connects each of said M first terminals to at least one of said M second terminals;

B) driver circuitry that includes
  i) M driver circuits, each driver circuit corresponding to a separate one of said M exchange circuitry second terminals, each driver circuit having a third terminal coupled to receive a signal provided from the second terminal to which said driver circuit corresponds and further having a fourth and a fifth terminal, said fifth terminal being connected to said other system components for data transfer therebetween, wherein,
  a) in a first mode, said each driver circuit drives, to the fourth terminal, the signal received at the third terminal and
  b) in a second mode, said each driver circuit drives, to the fifth terminal, the signal received at the third terminal C) latch and data select circuitry that includes
  i) M latch circuits, each latch circuit corresponding to a separate one of said M driver circuits and that latches a signal driven from the fourth terminal of the driver circuit to which said latch circuit corresponds;
  ii) M data selector circuits, each data selector circuit having a sixth and a seventh terminal, each of said sixth terminals coupled to receive a signal latched by a corresponding one of said M latch circuits and each of said seventh terminals coupled to receive a respective bit of the first system component, each data selector circuit further having an eighth terminal coupled to a corresponding one of said M first terminals, wherein
    a) in the first mode, said data selector provides, to said seventh terminal, said signal received by said sixth terminal; and
    b) in the second mode, said data selector circuit provides, to said eighth terminal, said signal received by said seventh terminal.

11. The bus transceiver circuit of claim 10, and further comprising:

control circuitry that receives at least one operation signal and that generates a plurality of control signals responsive thereto, wherein said exchange circuitry selectively connects each of said M first terminals to at least one of said M second terminals responsive to said control signals.

12. The bus transceiver circuit of claim 11, wherein said control circuitry also receives a mode indication signal that indicates whether said bus transceiver circuit is operating in the first mode or the second mode, and wherein said control circuitry generates said plurality of control signals also responsive to said mode indication signal.

* * * * *